US 8,564,715 B2

(12) United States Patent
Westerweck et al.

(10) Patent No.: US 8,564,715 B2
(45) Date of Patent: Oct. 22, 2013

(54) SYSTEM FOR STABILIZING AN OPTICS ASSEMBLY DURING TRANSLATION

(76) Inventors: Lothar Westerweck, San Jose, CA (US); Wolfram Grziwa, Amherst, NH (US); Russel L. Moore, Hudson, MA (US)

( * ) Notice: Subject to any disclaimer, the term of this patent is extended or adjusted under 35 U.S.C. 154(b) by 0 days.

(21) Appl. No.: 13/204,564

(22) Filed: Aug. 5, 2011

(65) Prior Publication Data
US 2011/0292526 A1  Dec. 1, 2011

Related U.S. Application Data

(62) Division of application No. 12/317,132, filed on Dec. 18, 2008, now Pat. No. 8,018,528, which is a division of application No. 11/514,811, filed on Sep. 1, 2006, now Pat. No. 7,531,773.

(60) Provisional application No. 60/715,533, filed on Sep. 8, 2005.

(51) Int. Cl.
*H04N 5/225* (2006.01)
*G02B 7/02* (2006.01)

(52) U.S. Cl.
USPC ............ 348/373; 348/374; 348/375; 359/822

(58) Field of Classification Search
None
See application file for complete search history.

(56) References Cited

U.S. PATENT DOCUMENTS

| 2,279,372 | A | 4/1942 | Herzberger |
| 3,087,384 | A | 4/1963 | Baur et al. |

(Continued)

FOREIGN PATENT DOCUMENTS

| CN | 1324012 A | 11/2001 |
| CN | 1846166 A1 | 10/2005 |

(Continued)

OTHER PUBLICATIONS

Office action dated Apr. 23, 2012, U.S. Appl. No. 13/214,696, filed Aug. 22, 2011, 28 pages.

(Continued)

*Primary Examiner* — Lin Ye
*Assistant Examiner* — John H Morehead, III
(74) *Attorney, Agent, or Firm* — Larry E. Henneman, Jr.; Gregory P. Gibson; Henneman & Associates, PLC

(57) ABSTRACT

An optical module includes a first optics group, a second optics group, and an image sensor, wherein the first optics group and second optics group are configured to provide an image having a focus and a magnification to the image sensor. In some embodiments of the present invention, a first optics assembly includes a first optics group coupled to a threaded portion of a first lead screw so that rotation of the first lead screw results in translation of the first optics group along an axis of the first lead screw, a first actuator for rotating the first lead screw; and a first sensing target configured to permit detection of rotation of the first lead screw. In some embodiments of the present invention a second optics assembly includes a second optics group coupled to a threaded portion of a second lead screw so that rotation of the second lead screw results in translation of the second optics group along an axis of the second lead screw, a second actuator for rotating the second lead screw, and second means for sensing configured to detect rotation of the second lead screw.

11 Claims, 16 Drawing Sheets

(56) References Cited

U.S. PATENT DOCUMENTS

| | | |
|---|---|---|
| 3,599,377 A | 8/1971 | Dartnell |
| 3,609,270 A | 9/1971 | Jorgensen et al. |
| 4,257,086 A | 3/1981 | Gulliksen |
| 4,290,168 A | 9/1981 | Binge |
| 4,879,592 A | 11/1989 | Ernest |
| 5,016,993 A | 5/1991 | Akitake |
| 5,034,824 A | 7/1991 | Morisawa et al. |
| 5,095,204 A | 3/1992 | Novini |
| 5,119,121 A | 6/1992 | Kobayashi et al. |
| 5,177,638 A | 1/1993 | Emura et al. |
| 5,196,963 A | 3/1993 | Sato et al. |
| 5,272,567 A | 12/1993 | Inoue |
| 5,510,937 A | 4/1996 | Mogamiya |
| 5,546,147 A | 8/1996 | Baxter et al. |
| 5,689,746 A | 11/1997 | Akada et al. |
| 5,754,210 A | 5/1998 | Haneda et al. |
| 5,805,362 A | 9/1998 | Hayes |
| 5,835,208 A | 11/1998 | Hollmann et al. |
| 5,908,586 A | 6/1999 | Hobbs et al. |
| 5,926,965 A | 7/1999 | Shijo et al. |
| 5,954,192 A | 9/1999 | Iitsuka |
| 5,966,248 A | 10/1999 | Kurokawa et al. |
| 6,091,902 A | 7/2000 | Komatsuzaki et al. |
| 6,282,380 B1 | 8/2001 | Yamamoto |
| 6,292,306 B1 | 9/2001 | Betensky |
| 6,330,400 B1 | 12/2001 | Bittner et al. |
| 6,417,601 B1 | 7/2002 | Kim |
| 6,530,703 B2 | 3/2003 | Nakano et al. |
| 6,597,516 B2 | 7/2003 | Saitoh et al. |
| 6,682,161 B2 | 1/2004 | Yun |
| 6,686,588 B1 | 2/2004 | Webster et al. |
| 6,760,167 B2 | 7/2004 | Meehan et al. |
| 6,762,888 B1* | 7/2004 | Oshima ............... 359/696 |
| 6,792,246 B2 | 9/2004 | Takeda et al. |
| 6,805,499 B2 | 10/2004 | Westerweck et al. |
| 6,869,233 B2 | 3/2005 | Westerweck et al. |
| 6,940,209 B2 | 9/2005 | Henderson |
| 7,010,224 B2 | 3/2006 | Nomura |
| 7,088,525 B2 | 8/2006 | Finizion et al. |
| 7,091,571 B1 | 8/2006 | Park et al. |
| 7,156,564 B2 | 1/2007 | Watanabe et al. |
| 7,193,793 B2 | 3/2007 | Murakami et al. |
| 7,259,497 B2 | 8/2007 | Sakano et al. |
| 7,301,712 B2 | 11/2007 | Kamo |
| 7,330,648 B2 | 2/2008 | Moringa et al. |
| 7,379,112 B1 | 5/2008 | Raad |
| 7,394,602 B2 | 7/2008 | Chen et al. |
| 7,400,454 B2 | 7/2008 | Kubota et al. |
| 7,420,609 B2 | 9/2008 | Yamaguchi et al. |
| 7,477,461 B2 | 1/2009 | Bareau et al. |
| 7,531,773 B2 | 5/2009 | Westerweck et al. |
| 7,573,011 B2 | 8/2009 | Westerweck et al. |
| 7,580,209 B2 | 8/2009 | Westerweck et al. |
| 7,590,505 B2 | 9/2009 | Grziwa et al. |
| 7,605,991 B2 | 10/2009 | Chiang |
| 7,623,301 B2 | 11/2009 | Westerweck et al. |
| 7,638,813 B2 | 12/2009 | Kinsman |
| 7,670,067 B2 | 3/2010 | Utz |
| 7,675,565 B2 | 3/2010 | Cheng |
| 7,679,669 B2 | 3/2010 | Kwak |
| 7,806,606 B2 | 10/2010 | Westerweck |
| 8,018,528 B2 | 9/2011 | Westerweck et al. |
| 8,092,102 B2 | 1/2012 | Shangguan et al. |
| 8,112,128 B2 | 2/2012 | Lee |
| 2001/0028513 A1 | 10/2001 | Takanashi et al. |
| 2002/0012066 A1 | 1/2002 | Nagai |
| 2002/0018140 A1 | 2/2002 | Suemoto et al. |
| 2002/0102946 A1 | 8/2002 | SanGiovanni |
| 2002/0136556 A1 | 9/2002 | Nomura et al. |
| 2002/0142798 A1 | 10/2002 | Miyake |
| 2002/0144369 A1 | 10/2002 | Biggs et al. |
| 2003/0012573 A1 | 1/2003 | Sekizawa et al. |
| 2003/0043477 A1 | 3/2003 | Saitoh |
| 2003/0174419 A1 | 9/2003 | Kindler et al. |
| 2004/0017501 A1 | 1/2004 | Asaga et al. |
| 2004/0027687 A1 | 2/2004 | Bittner et al. |
| 2004/0042780 A1 | 3/2004 | Kindaichi et al. |
| 2004/0042785 A1 | 3/2004 | Watanabe et al. |
| 2004/0042786 A1 | 3/2004 | Watanabe et al. |
| 2004/0056970 A1 | 3/2004 | Westerweck et al. |
| 2004/0056974 A1 | 3/2004 | Kitajima et al. |
| 2004/0057720 A1 | 3/2004 | Westerweck et al. |
| 2004/0095657 A1 | 5/2004 | Takanashi et al. |
| 2004/0203532 A1 | 10/2004 | Mizuta |
| 2004/0223068 A1 | 11/2004 | Kamo |
| 2004/0223072 A1 | 11/2004 | Maeda et al. |
| 2004/0258405 A1 | 12/2004 | Shiratori et al. |
| 2005/0014538 A1 | 1/2005 | Hyun et al. |
| 2005/0063698 A1 | 3/2005 | Usuda et al. |
| 2005/0157195 A1 | 7/2005 | Ohashi et al. |
| 2005/0162534 A1 | 7/2005 | Higashiyama et al. |
| 2005/0185088 A1 | 8/2005 | Kale et al. |
| 2005/0219399 A1 | 10/2005 | Sato et al. |
| 2005/0248684 A1 | 11/2005 | Machida |
| 2005/0264670 A1 | 12/2005 | Yamaguchi et al. |
| 2005/0274883 A1 | 12/2005 | Nagano |
| 2006/0006486 A1 | 1/2006 | Seo et al. |
| 2006/0049720 A1* | 3/2006 | Henderson et al. ........... 310/328 |
| 2006/0056389 A1 | 3/2006 | Monk et al. |
| 2006/0083503 A1 | 4/2006 | Fukai |
| 2006/0103754 A1 | 5/2006 | Wenstrand et al. |
| 2006/0113867 A1 | 6/2006 | Sakatani et al. |
| 2006/0124746 A1 | 6/2006 | Kim et al. |
| 2006/0132644 A1 | 6/2006 | Shangguan et al. |
| 2006/0209205 A1 | 9/2006 | Tsai |
| 2006/0243884 A1 | 11/2006 | Onodera et al. |
| 2006/0261257 A1 | 11/2006 | Hwang |
| 2006/0291061 A1 | 12/2006 | Iyama et al. |
| 2007/0018043 A1 | 1/2007 | Lamoree et al. |
| 2007/0053672 A1 | 3/2007 | Westerweck et al. |
| 2007/0058069 A1 | 3/2007 | Chen et al. |
| 2007/0074966 A1 | 4/2007 | Yamamoto et al. |
| 2007/0077051 A1 | 4/2007 | Toor et al. |
| 2007/0077052 A1 | 4/2007 | Chang |
| 2007/0086777 A1* | 4/2007 | Fujita ............... 396/452 |
| 2007/0108847 A1 | 5/2007 | Chang |
| 2007/0122146 A1 | 5/2007 | Ryu |
| 2007/0146489 A1 | 6/2007 | Kosako et al. |
| 2007/0147195 A1* | 6/2007 | Morinaga ............... 369/44.14 |
| 2007/0154198 A1* | 7/2007 | Oh et al. ............... 396/85 |
| 2007/0201866 A1 | 8/2007 | Kihara |
| 2007/0217786 A1 | 9/2007 | Cho et al. |
| 2007/0280667 A1 | 12/2007 | Shin |
| 2011/0052183 A1 | 3/2011 | Westerweck |
| 2011/0299848 A1 | 12/2011 | Shangguan et al. |

FOREIGN PATENT DOCUMENTS

| | | |
|---|---|---|
| CN | 1722453 A | 1/2006 |
| DE | 10346374 A1 | 4/2005 |
| EP | 59176710 | 6/1984 |
| EP | 11052210 | 2/1999 |
| EP | 1 148 406 A2 | 10/2001 |
| EP | 1 148 406 A3 | 10/2001 |
| EP | 1 357 726 A1 | 10/2003 |
| GB | 1378515 A1 | 12/1974 |
| GB | 2 315 186 A | 1/1998 |
| GB | 2 387 063 A | 1/2003 |
| JP | 2-123335 | 5/1990 |
| JP | 2002-286987 | 5/1990 |
| JP | 6160699 A | 6/1994 |
| JP | 11-72678 | 3/1999 |
| JP | 2001-188155 A | 7/2001 |
| JP | 2002-189163 A | 7/2002 |
| JP | 2003-051973 A | 2/2003 |
| JP | 2004-139035 A | 5/2004 |
| JP | 2004-219982 A | 8/2004 |
| JP | 2004-302058 A | 10/2004 |
| JP | 2005-107084 | 4/2005 |
| JP | 2005-210628 A | 8/2005 |
| JP | 2005-292235 A | 10/2005 |
| JP | 200653232 A | 2/2006 |
| JP | 2006-162829 A | 6/2006 |
| JP | 2006-039480 | 9/2006 |

(56) References Cited

FOREIGN PATENT DOCUMENTS

| JP | 2007-086818 A | 4/2007 |
|---|---|---|
| JP | 2007-108534 | 4/2007 |
| JP | 2007-121820 A | 5/2007 |
| TW | 466375 B | 12/2001 |
| WO | 0006973 A1 | 2/2000 |

OTHER PUBLICATIONS

"High Precision Optical Assembly Starts Here", Laser Alignment and Assembly Station, Opto-Alignment Technology, Inc., 1996, 4 pages.
U.S. Appl. No. 12/317,132, Notice of Allowance dated May 12, 2011.
U.S. Appl. No. 11/514,811, Office Action dated Jun. 2, 2008.
U.S. Appl. No. 11/514,811, Notice of Allowance dated Sep. 22, 2008.
PCT Application No. PCT/US06/034792, International Search Report and Written Opinion dated Aug. 7, 2007.
PCT Application No. PCT/US06/034792, International Preliminary Report on Patentability dated Mar. 11, 2008.
CA Application No. 2,620,842, Office Action dated Mar. 7, 2013.
CN Application No. 2006-80041383.0, Office Action dated Dec. 18, 2009 (English translation).
CN Application No. 2006-80041383.0, Office Action dated Jun. 24, 2010 (English translation).
CN Application No. 2006-80041383.0, Office Action dated Oct. 14, 2010 (English translation).
EP Application No. 06814261.1, European Search Report dated Jul. 5, 2010.
EP Application No. 06814261.1, Supplemental European Search Report dated Jul. 22, 2010.
EP Application No. 06814261.1, Office Action dated Jun. 17, 2011.
EP Application No. 06814261.1, Notice of Allowance dated Jun. 28, 2012.
JP Application No. 2008-530180, Office Action dated Sep. 30, 2011 (English translation).
JP Application No. 2008-530180, Office Action dated Aug. 21, 2012 (English translation).
KR Application No. 10-2008-7005469, Office Action dated Sep. 25, 2012 (English translation).
KR Application No. 10-2008-7005469, Notice of Allowance dated May 16, 2013 (English translation).
U.S. Appl. No. 11/888,939, Office Action dated Jul. 18, 2008.
U.S. Appl. No. 11/888,939, *Ex Parte Quayle* Action dated Dec. 3, 2008.
U.S. Appl. No. 11/888,939, Notice of Allowance dated May 21, 2009.
PCT Application No. PCT/US07/017696, International Search Report and Written Opinion dated Aug. 7, 2008.
PCT Application No. PCT/US07/017696, International Preliminary Report on Patentability dated Feb. 10, 2009.
CN Application No. 200780037571.0, Office Action dated Jun. 8, 2010 (English translation).
CN Application No. 200780037571.0, Notice of Allowance dated Apr. 27, 2011 (English translation).
U.S. Appl. No. 11/888,979, Restriction Requirement dated Jun. 11, 2008.
U.S. Appl. No. 11/888,979, Office Action dated Oct. 24, 2008.
U.S. Appl. No. 11/888,979, Notice of Allowance dated Feb. 3, 2009.
PCT Application No. PCT/US07/017698, International Search Report and Written Opinion dated Aug. 8, 2008.
PCT Application No. PCT/US07/017698, International Preliminary Report on Patentability dated Feb. 10, 2009.
CN Application No. 200780037641.2, Office Action dated May 21, 2010 (English translation).
CN Application No. 200780037641.2, Office Action dated Dec. 6, 2010 (English translation).
CN Application No. 200780037641.2, Office Action dated Apr. 13, 2011 (English translation).
CN Application No. 200780037641.2, Notice of Allowance dated Aug. 8, 2011 (English translation).
U.S. Appl. No. 11/893,940, Office Action dated Jan. 27, 2009.
U.S. Appl. No. 11/893,940, Notice of Allowance dated May 7, 2009.
PCT Application No. PCT/US07/019933, International Search Report and Written Opinion dated Aug. 23, 2008.
PCT Application No. PCT/US07/019933, International Preliminary Report on Patentability dated Mar. 17, 2009.
U.S. Appl. No. 12/287,469, Office Action dated Jun. 11, 2009.
U.S. Appl. No. 12/287,469, Notice of Allowance dated Sep. 21, 2009.
U.S. Appl. No. 11/644,459, Office Action dated Apr. 22, 2008.
U.S. Appl. No. 11/644,459, Notice of Allowance dated Sep. 16, 2008.
PCT Application No. PCT/US07/026335, International Search Report and Written Opinion dated Sep. 3, 2008.
PCT Application No. PCT/US07/026335, International Preliminary Report on Patentability dated Jul. 2, 2009.
CN Application No. 200780047588.4, Office Action dated Sep. 19, 2010 (English translation).
CN Application No. 200780047588.4, Notice of Allowance dated May 20, 2011 (English translation).
JP Application No. 2009-542972, Office Action dated Dec. 18, 2012 (English translation).
U.S. Appl. No. 11/444,277, Office Action dated Aug. 5, 2008.
U.S. Appl. No. 11/444,277, Office Action dated May 7, 2009.
U.S. Appl. No. 11/444,277, Office Action dated Nov. 18, 2009.
U.S. Appl. No. 11/444,277, Office Action dated Aug. 3, 2010.
U.S. Appl. No. 11/444,277, Office Action dated Mar. 1, 2011.
U.S. Appl. No. 11/444,277, Notice of Allowance dated Aug. 18, 2011.
PCT Application No. PCT/US2007/013014, International Search Report and Written Opinion dated Aug. 27, 2008.
PCT Application No. PCT/US2007/013014, International Preliminary Report on Patentability dated Dec. 18, 2009.
CN Application No. 200780026542.4, Office Action dated Nov. 13, 2009 (English translation).
CN Application No. 200780026542.4, Office Action dated Apr. 27, 2011 (English translation).
CN Application No. 200780026542.4, Office Action dated Oct. 9, 2011 (English translation).
Japanese Application No. 2009-513308, Office Action dated Dec. 9, 2011(English translation).
U.S. Appl. No. 13/214,696, Office Action dated Jan. 13, 2012.
KR Application No. 10-2013-7005101, Office Action dated May 29, 2013 (English translation).
TW Application No. 095132640, Office Action dated Jul. 17, 2013 (English translation).

* cited by examiner

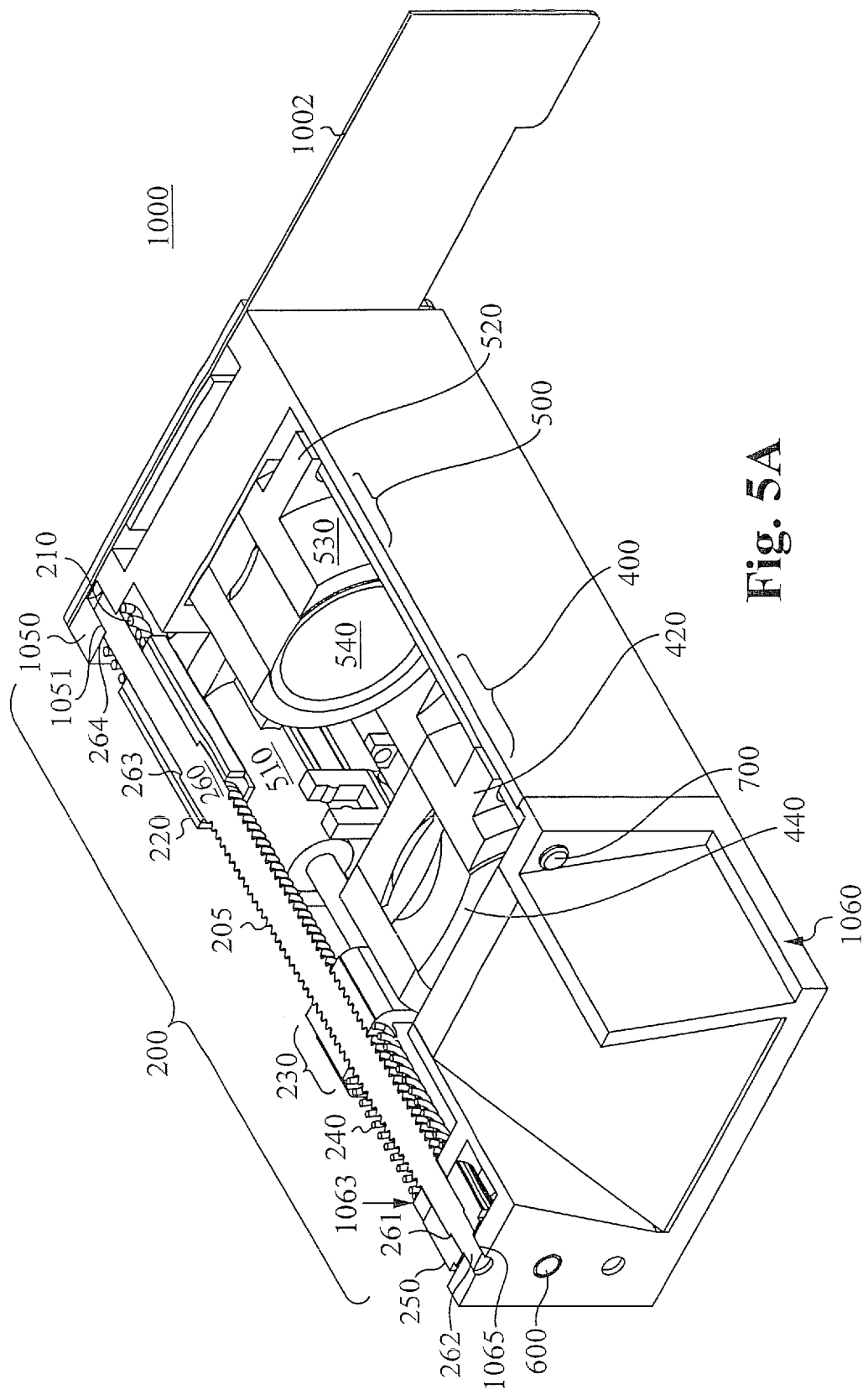

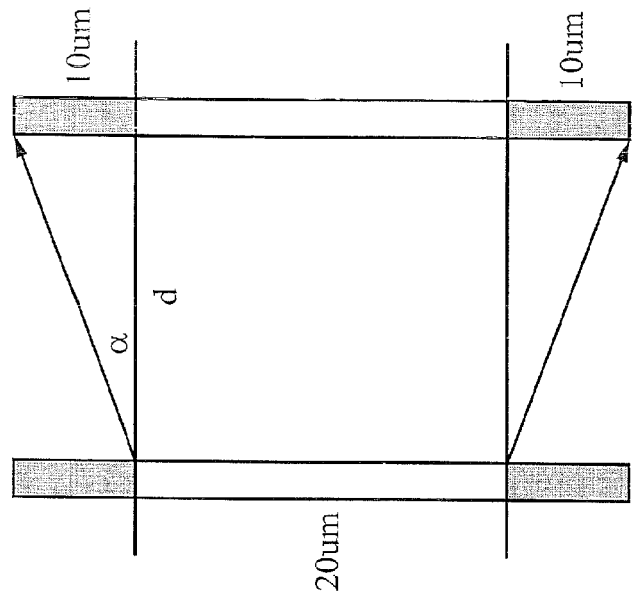
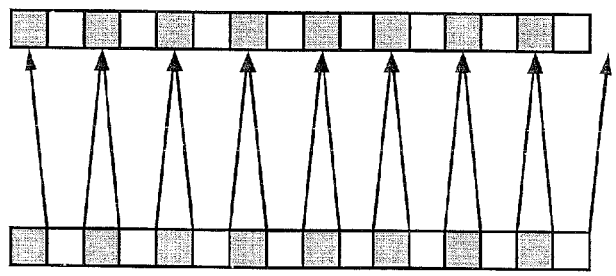
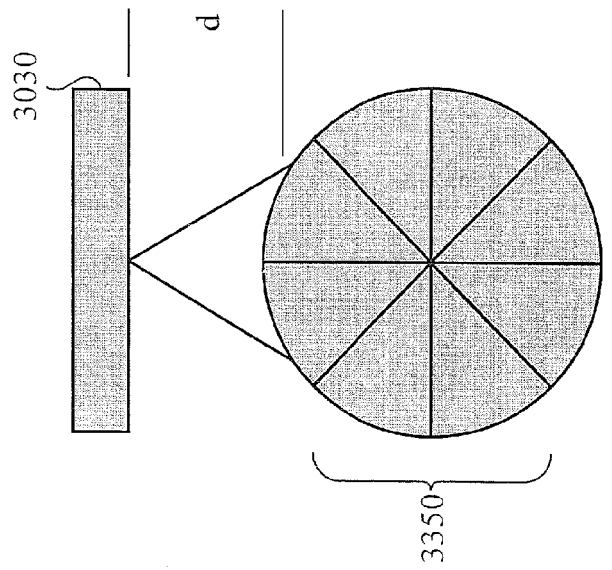
Fig. 8A
Fig. 8B
Fig. 8C

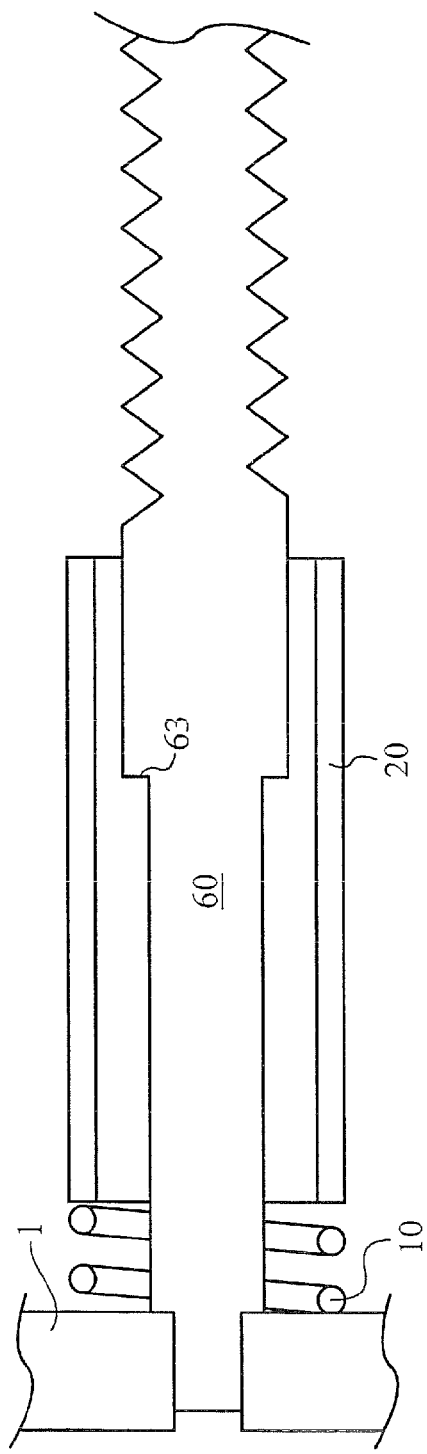
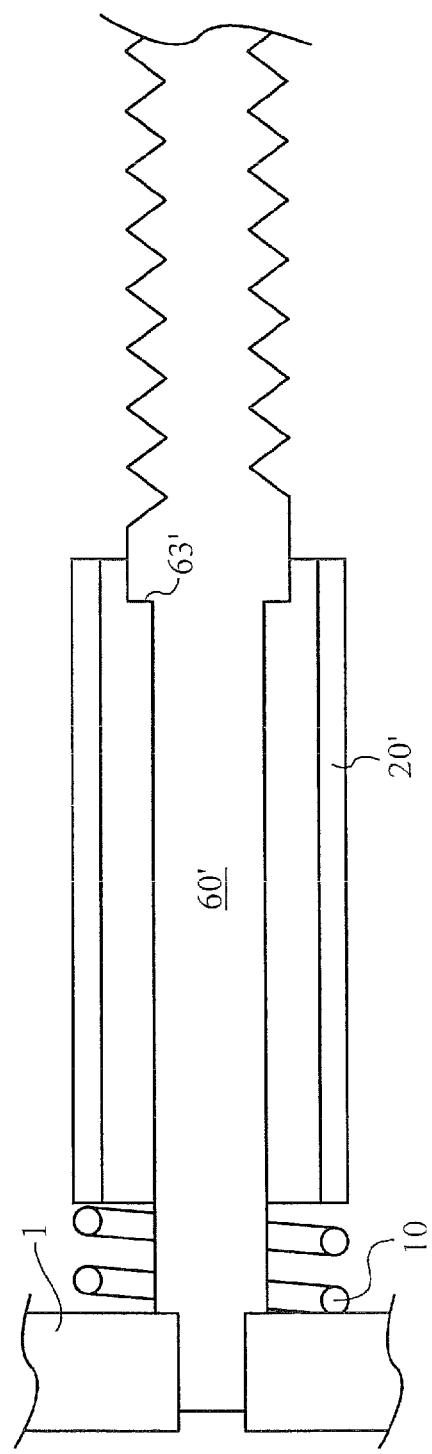

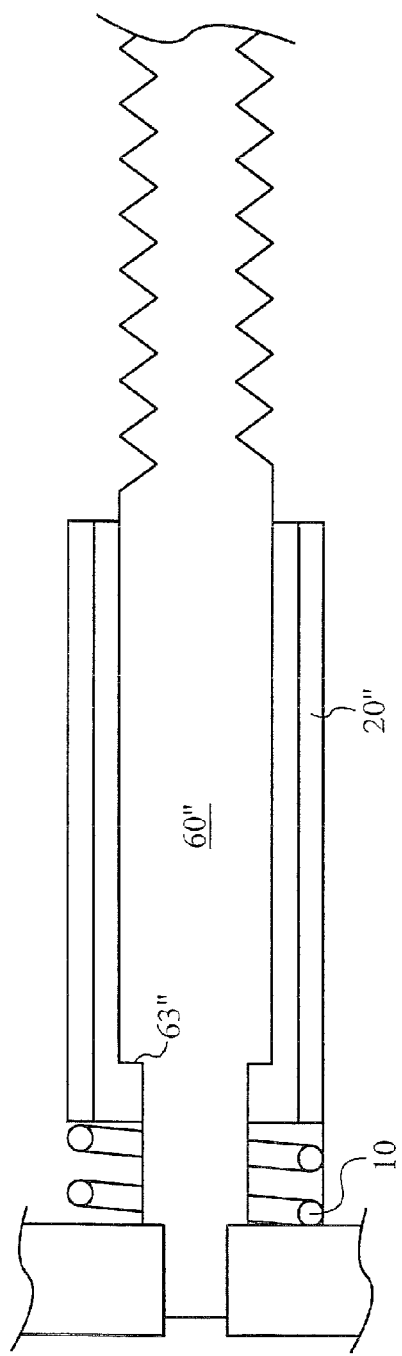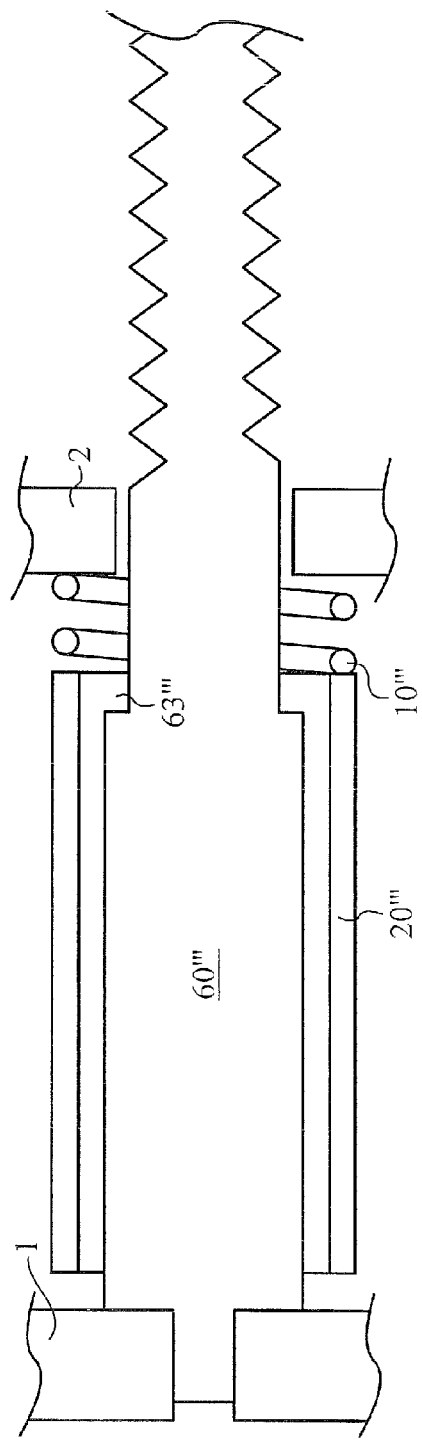

SYSTEM FOR STABILIZING AN OPTICS ASSEMBLY DURING TRANSLATION

RELATED APPLICATIONS

This Patent Application is a Divisional Application which claims priority under 35 U.S.C. 121 of the co-pending U.S. patent application Ser. No. 12/317,132, filed Dec. 18, 2008, entitled "BACKLASH PREVENTION SYSTEM AND METHOD" which is a Divisional Application that claims priority under 35 U.S.C. 121 of the U.S. patent application Ser. No. 11/514,811, filed Sep. 1, 2006, entitled "AUTO-FOCUS AND ZOOM MODULE" now U.S. Pat. No. 7,531,773, issued on May 12, 2009, which in turn claims priority under 35 U.S.C. 119(e) of the U.S. Provisional Pat. App. No. 60/715,533, filed Sep. 8, 2005, entitled "3× ZOOM MINI MODULE", all of which are hereby incorporated by reference.

FIELD OF THE INVENTION

The disclosure relates to camera optics, specifically an auto-focus and zoom module.

BACKGROUND

Recently, there have been numerous developments in digital camera technology. One such development is the further miniaturization of optical and mechanical parts to the millimeter and sub millimeter dimensions. The shrinkage in the moving parts of cameras has allowed the implementation of modern digital camera and optical technology into a broader range of devices. These devices are also constantly being designed and constructed into smaller and smaller form factor embodiments. For example, commercially available personal electronic devices such as cellular phones, personal digital assistants (PDAs), and wrist and/or pocket watches include a miniature digital camera. Moreover, larger form factor devices are also packed with additional features. For example, a typical video camcorder often has an entire digital camera for "still" photography built into the camcorder device along with the mechanisms and circuitry for motion video recording.

Typically, however, modern digital camera implementations suffer from a variety of constraints. Some of these constraints include cost, size, features, and complexity. For instance, with a reduction in size typically comes an increase in cost, a reduction in features and/or an increase in complexity.

SUMMARY OF THE DISCLOSURE

The present invention is for an optical module. The optical module has a first optics group, a second optics group, and an image sensor. The first optics group and second optics group are configured to provide an image having a focus and a magnification to the image sensor.

In some embodiments of the present invention, an optics module includes a first optics group coupled to a threaded portion of a first lead screw. Rotation of the first lead screw results in translation of the first optics group along an axis of the first lead screw. A first actuator rotates the first lead screw. A first sensing target is configured to permit detection of rotation of the first lead screw. In some embodiments of the present invention the optical module further comprises a second optics group coupled to a threaded portion of a second lead screw. Rotation of the second lead screw results in translation of the second optics group along an axis of the second lead screw. A second actuator rotates the second lead screw. A second means for sensing is configured to detect rotation of the second lead screw.

A housing can be included as well. The first optics assembly, second optics assembly, and, are mounted within the housing.

The first sensing target can include a closed surface having adjacent regions of differing optical properties arranged in an alternating pattern symmetric about the axis or rotation of the first lead screw. The second sensing target can include a closed surface having adjacent regions of differing optical properties arranged in an alternating pattern symmetric about the axis or rotation of the second lead screw. Preferably, the second sensing target is configured to permit measurement of translation of the second optics group along the second lead screw. The first sensing target is configured to permit measurement of translation of the first optics group along the first lead screw. Most preferably, the first sensing target permits measurement over a range of at least 10 mm with a resolution of less than 10 microns. The second sensing target permits measurement over a range of at least 2 mm with a resolution of less than 10 microns.

In some embodiments, the first lead screw includes a threaded portion having a first outer thread diameter, a non-threaded portion having a first outer diameter, and a first actuator registering feature. The first optics group is coupled to the threaded portion of a first lead screw so that rotation of the first lead screw results in translation of the first optics group along an axis of the first lead screw. A first gearlash prevention spring is configured to bias the first optics group toward the non-threaded portion of the first lead screw. A first cylindrical vibrational actuator rotates the first lead screw. The first cylindrical vibration actuator is held over the non-threaded portion and against the actuator registering feature of the first lead screw by a spring force from a first preload spring that abuts both the housing and the first actuator. The first cylindrical vibrational actuator is constrained at a node point by a flexible coupling to the housing. First means for sensing detects rotation of the first lead screw.

In some embodiments, the first outer thread diameter is greater than the first outer diameter. In other embodiments the first outer thread diameter is less than the first outer diameter. In yet other embodiments, the first outer thread diameter and the first outer diameter are equal.

In some embodiments the second lead screw a second lead screw includes a threaded portion having a second outer thread diameter, a non-threaded portion having a second outer diameter, and a second actuator registering feature. The second optics group is coupled to the threaded portion of a second lead screw so that rotation of the second lead screw results in translation of the second optics group along an axis of the second lead screw. A second gearlash prevention spring is configured to bias the second optics group toward the non-threaded portion of the second lead screw. A second cylindrical vibrational actuator rotates the second lead screw. The second cylindrical vibrational actuator is held over the non-threaded portion and against the actuator registering feature of the second lead screw by a second preload spring that abuts both the housing and the second actuator. The second cylindrical vibrational actuator is constrained at a node point by a flexible coupling to the housing. Second means for sensing detects rotation of the second lead screw.

Preferably, the first actuator registering feature is disposed between the threaded portion and the non-threaded portion of the first lead screw. Also preferably, the second actuator registering feature is disposed between the threaded portion and the non-threaded portion of the second lead screw.

In some embodiments, the second outer thread diameter is greater than the second outer diameter. In other embodiments, the second outer thread diameter is less than the second outer diameter. In yet other embodiments, the second outer thread diameter and the second outer diameter are equal.

Some embodiments of the present invention relate to an auto focus and zoom module that includes a cylindrical vibrational actuator of the type that oscillates in a standing wave pattern to drive a shaft placed therein to rotate. An auto focus and zoom module in accordance with these embodiments comprises a housing, an optics assembly, and an image sensor, wherein the optics group is configured to provide an image having a focus and a magnification to the image sensor. The optics assembly comprises a lead screw including a threaded portion having an outer thread diameter, a non-threaded portion having an outer diameter, and an actuator registering feature. An optics group is coupled to a threaded portion of the lead screw so that rotation of the lead screw results in translation of the optics group along an axis of the lead screw. A cylindrical vibrational actuator rotates the lead screw held over the non-threaded portion and against the actuator registering feature of the lead screw by a preload spring that abuts both the housing and the actuator and constrained at a node point of its preferred standing wave pattern by a flexible coupling to the housing. Means for sensing detects rotation of the lead screw. Preferably, the actuator registering feature is disposed between the threaded portion and the non-threaded portion In some embodiments of the present invention, an auto-focus and zoom module comprises a first guide pin, a second guide pin, a first optics assembly, a second optics assembly, and an image sensor, wherein the first optics group and second optics group are configured to provide an image having a focus and a magnification to the image sensor.

In some embodiments, a first optics assembly includes a first lead screw including a threaded portion having a first outer thread diameter, a non-threaded portion having a first outer diameter, and an actuator registering feature wherein the actuator registering feature is disposed between the threaded portion and the non-threaded portion. A first optics group includes a first spring-hinged assembly of two threaded coupling arms arranged in opposition and configured to couple with the threaded portion of the first lead screw. Thus, rotation of the first lead screw results in translation of the first optics group along an axis of the first lead screw. The spring hinge assembly is coupled to and coupled to the first guide pin and the second guide pin. A first actuator rotates the first lead screw. First means for sensing to detect rotation of the first lead screw.

In some embodiments the first outer thread diameter is greater than the first outer diameter. In other embodiments, the first outer thread diameter is less than the first outer diameter. In yet other embodiments, the first outer thread diameter and the first outer diameter are equal.

Some embodiments of the present invention relate to a method of preventing backlash in a system using a threaded lead screw as a drive element. The method comprises the steps of providing a lead screw having an axis and a threaded region with a thread depth and thread pitch. A spring-hinged assembly of a plurality of teethed coupling arms is arranged in opposition and configured to couple with the threaded portion of the lead screw rotation of the lead screw results in translation of the second optics group along an axis of the second lead screw, wherein teeth of the teethed coupling arms have a tooth depth and tooth pitch, wherein the tooth depth is substantially less than the thread depth, and the tooth pitch is greater than the thread pitch.

In accordance with the present invention an optical module preferably includes a prism element coupled to an optics group, wherein the prism directs to the optics group an image that is at an angle with respect to a plane of the module.

BRIEF DESCRIPTION OF THE DRAWINGS

The novel features of the invention are set forth in the appended claims. However, for purpose of explanation, several embodiments of the invention are set forth in the following figures.

FIG. 5A is a sectional perspective view of an auto-focus and zoom module in accordance with some embodiments of the invention.

FIG. 8A is a schematic representation of a distance sensor in accordance with some embodiments of the invention.

FIG. 8B is a schematic representation of beam spreading that occurs during distance sensing in accordance with some embodiments of the invention.

FIG. 8C is a schematic representation of beam spreading that occurs during distance sensing in accordance with some embodiments of the invention.

FIG. 12A is a sectional view of a portion of an assembly illustrating an actuator mount consistent with some embodiments of the present invention.

FIG. 12B is a sectional view of a portion of an assembly illustrating an actuator mount consistent with some embodiments of the present invention.

FIG. 12C is a sectional view of a portion of an assembly illustrating an actuator mount consistent with some embodiments of the present invention.

FIG. 12D is a sectional view of a portion of an assembly illustrating an actuator mount consistent with some embodiments of the present invention.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

A. Structural

Figure 1:
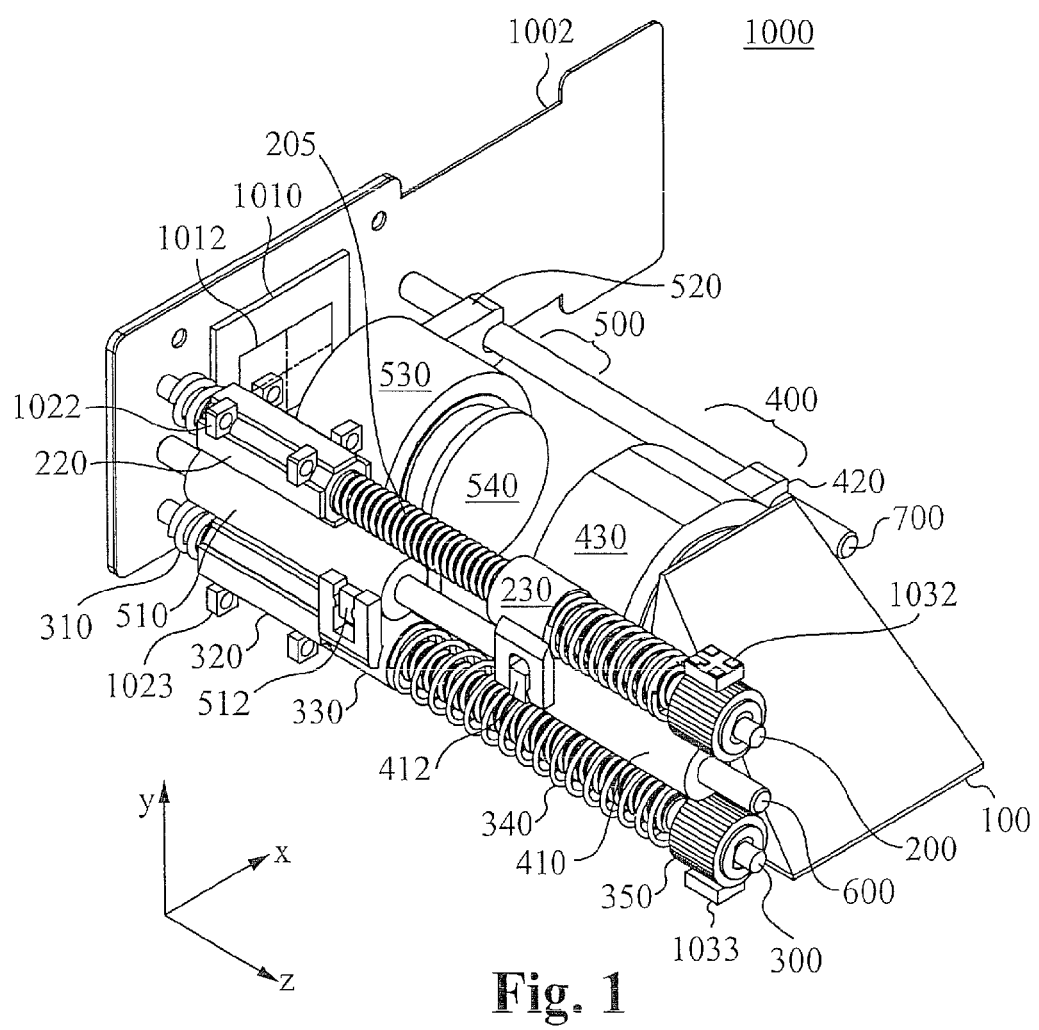
FIG. 1 is a perspective view of an auto-focus and zoom module in accordance with some embodiments of the invention.

FIG. 1 illustrates an auto-focus and zoom module 1000 in accordance with some embodiments of the invention. As shown in this figure, the module 1000 includes a front optics group 400, a rear optics group 500, and an image sensor 1010. The front optics group 400 and rear optics group 500 typically comprise one or more optical elements such as a lens. For instance, the module 1000 illustrated in FIG. 4 includes several optical lenses in both the front optics group 400 and rear optics group 500. However, one of ordinary skill will recognize both more complex and simpler arrangements for the optics groups.

B. Assembly Details

Figure 2:
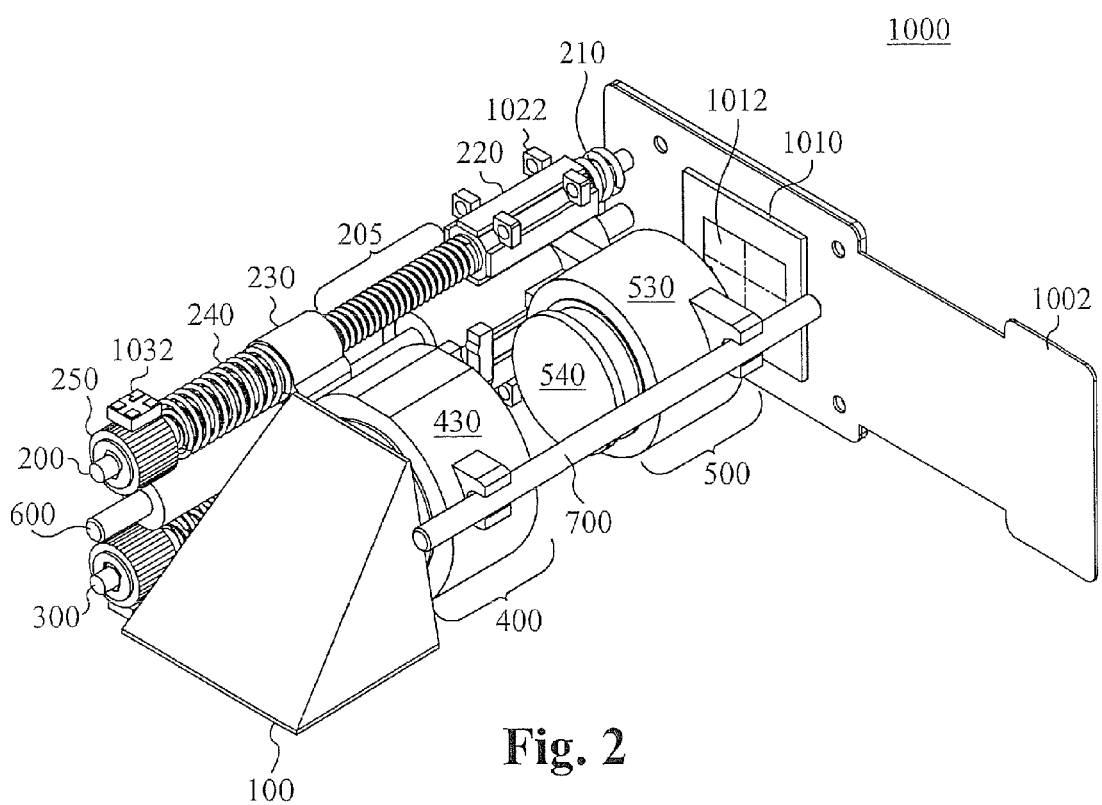
FIG. 2 is a perspective view of an auto-focus and zoom module in accordance with some embodiments of the invention.

FIGS. 1 and 2 illustrate further details of module 1000. The module of some embodiments comprises a front and rear housing coupled to one another and aligned by guide pins. The guide pins are further used to guide movement of the barrels. FIG. 5A illustrates the housing, comprising the rear component 1050 and the front component 1060, which provides a structural frame for the various assemblies of the module 1000. The lead screw assemblies 200 and 300, as well as the guide pins 600 and 700 are coupled to the housing. This coupling positions and secures the components relative to one another, and to the target region 1012 of the image sensor 1010, providing a chassis for an auto-focus and zoom module capable of providing an image with a magnification and zoom to the target region 1012.

Attached to the front housing are the front barrel and optionally a prism. The housing of the module preferably further includes a casing and a cover mechanism. The cover mechanism preferably prevents light leakage and dust contamination from affecting the internal components of the module, particularly the lens groups and the image sensor. Attached to the rear housing are the image sensor and, optionally, an infrared (IR) filter and/or a low pass filter.

Image Sensor

As shown in the figures, the image sensor 1010 defines preferably a plane. In FIG. 1, this plane is parallel to an x-y plane. Typically, the module 1000 is configured to provide an image to the image sensor 1010 along an image vector parallel to a z-axis.

Guide Pins

FIG. 1 illustrates a guide pin arrangement for an auto-focus and zoom module in accordance with some embodiments. Some embodiments include a pair of guide pins, while some embodiments employ a different number of guide pins. Regardless of their number, the guide pins 600 and 700 are typically mounted along a linear axis of the module 1000 to permit the rear barrel 530 and the front barrel 430 to move relative to the image sensor 1010. In the module 1000, the primary guide pin 600 and the secondary guide pin 700 are aligned so that their axes are substantially parallel to each other and to the z-axis. Further, the lead screw assemblies 200 and 300 are also aligned so that their axes are substantially parallel to each other, the z-axis, and the guide pins 600 and 700.

Typically, the guide pins 600 and 700 are coupled to the front component 1050 and the rear component 1060 of the housing on opposite sides of the image vector of the image sensor 1010. However, one skilled in the art will recognize that other configurations are possible. The lead screws 200 and 300 are typically coupled to the front component 1050 and the rear component 1060 of the housing on the same side of the image sensor 1010.

In some embodiments, the range of motion provided to the rear barrel 530 by the guide pins 600 and 700 is approximately 7 millimeters. In some embodiments, the range of motion provided to the front barrel 430 the guide pins 600 and 700 is approximately 2 millimeters. Due to this range of motion, however, the guide pins 600 and 700 of some embodiments often affect the form factor of the module 1000. Hence, some embodiments further include means for modifying and/or concealing the form factor of the module 1000.

Prism Feature

An optional prism feature can also be included. This feature allows the auto-focus and zoom module to be disposed and/or mounted in a variety of orientations. For instance, the horizontal width of a particular implementation is often limited such that the module is preferably disposed lengthwise in the vertical plane of an enclosure. This orientation allows the range of motion of the front and rear barrels along the guide pins, as described above, to be implemented in a device having a small width and/or depth form factor.

Figure 5B:
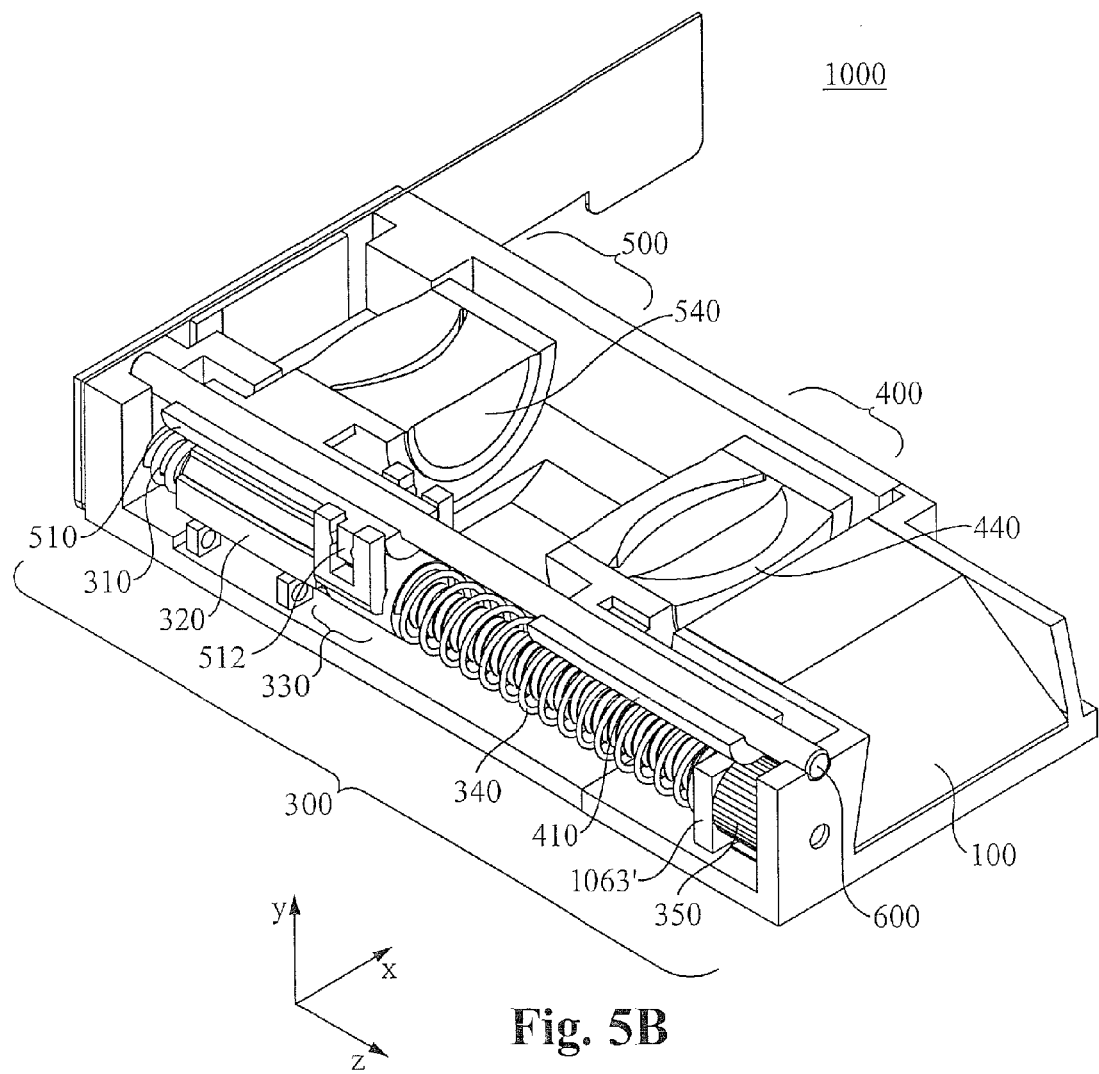
FIG. 5B is a sectional perspective view of an auto-focus and zoom module in accordance with some embodiments of the invention.

FIGS. 1 and 5B illustrate a prism feature of some of these embodiments. FIG. 1 includes a module 1000 with a prism 100 mounted at the front barrel 430. The prism 100 redirects the light from an image at an angle with respect to the front barrel 430. As described above, the front barrel 430 typically houses a front lens group. The front lens group contains one or more front optical elements such as the front lens 440 illustrated in FIG. 5B. Hence the prism 100 allows the module 1000 to be disposed in a variety of orientations within a device that is typically held at an angle with respect to the subject being viewed and/or photographed.

FIG. 5B illustrates the small form factor of a prism 100 mounted on a module 1000 in accordance with some embodiments. In these embodiments, the combination of a prism holder and a prism bracket advantageously mount the prism adjacent to the front lens 440 of the module 1000. As described above, the prism 100 typically redirects light from a subject image that is at an angle with respect to the front lens 440 of the module 1000.

Lens System

As shown in the figures, the rear optics group 500 and front optics group 400 have a predefined constructions. The rear optics group 500 further includes the rear barrel 530, the rear guide sleeve 510, and the rear guide slot 520. The rear barrel typically houses one or more lenses or other optical elements. As illustrated, the rear barrel 530 houses the rear lens 540. The rear barrel 530 is a substantially cylindrical body with a central axis. The rear lens 540 is configured to direct light along the central axis of the rear barrel 530. The rear guide sleeve 510 is an elongated, substantially cylindrical body coupled to the rear barrel 530 so that the central axis of the rear barrel 530 and an axis of the rear guild sleeve 510 are substantially parallel. The rear guide slot 520 is a slotted feature configured to interface with a cylinder.

The front optics group 400 further includes the front barrel 430, the front guide sleeve 410, and the front guide slot 420. The front barrel typically houses the front lens 440 (e.g. of FIG. 5B). The front barrel 430 is a substantially cylindrical body with a central axis. The front lens 440 is configured to direct light along the central axis of the front barrel 430. The front guide sleeve 410 is an elongated, substantially cylindrical body coupled to the front barrel 430 so that the central axis of the front barrel 430 and an axis of the front guild sleeve 410 are substantially parallel. The front guide slot 420 is a slotted feature configured to interface with a cylinder.

Lens-Guide Pin Interface

Referring now to FIG. 5B, the front optics group 400 includes the front guide sleeve 410, which couples with the primary guide pin 600. As illustrated, the front guide sleeve 410 is substantially elongated relative to the front barrel 430. Further, the front guide sleeve 410 is rigidly connected to the front barrel 430. This configuration prevents the front optics group 400 from rotating within the y=z plane or x-z plane relative to the primary guide pin 600, but permits rotation within the x-y plane, assuming the guide pin 600 lies along the z-axis. The rear optics group 500 includes the rear guide sleeve 510, which couples with the primary guide pin 600. As illustrated, the rear guide sleeve 510 is substantially elongated relative to the rear barrel 530. Further, the rear guide sleeve 510 is rigidly connected to the rear barrel 530. This configuration prevents the rear optics group 500 from rotating within the y-z plane or x-z plane relative to the primary guide pin 600, but permits rotation within the x-y plane, assuming the guide pin 600 lies along the z-axis.

Referring now to FIG. 1, the front optics group 400 also includes the front guide slot 420, configured to couple with the secondary guide pin 700. The coupling between the guide slot 420 and the secondary guide pin 700 prevents the front optics group 400 from rotating within the x-y plane relative to either of the guide pins 600 and 700. The coupling between the front optics group 400 and guide pins 600 and 700 permits the front optics group 400 to translate along the axis defined by the two guide pins (the z-axis in FIG. 1), but not to move in either of the axes orthogonal to that axis (here the x and y axes).

The rear optics group 500 also includes the rear guide slot 520, configured to couple with the secondary guide pin 700. The coupling between the guide slot 520 and the secondary guide pin 700 prevents the rear optics group 500 from rotating within the x-y plane relative to either of the guide pins 600 and 700. The coupling between the rear optics group 500 and guide pins 600 and 700 permits the rear optics group 500 to translate along the axis defined by the two guide pins (the z-axis in FIG. 1), but not to move in either of the axes orthogonal to that axis (here the x and y axes).

Lead Screw Assemblies

Figure 3:
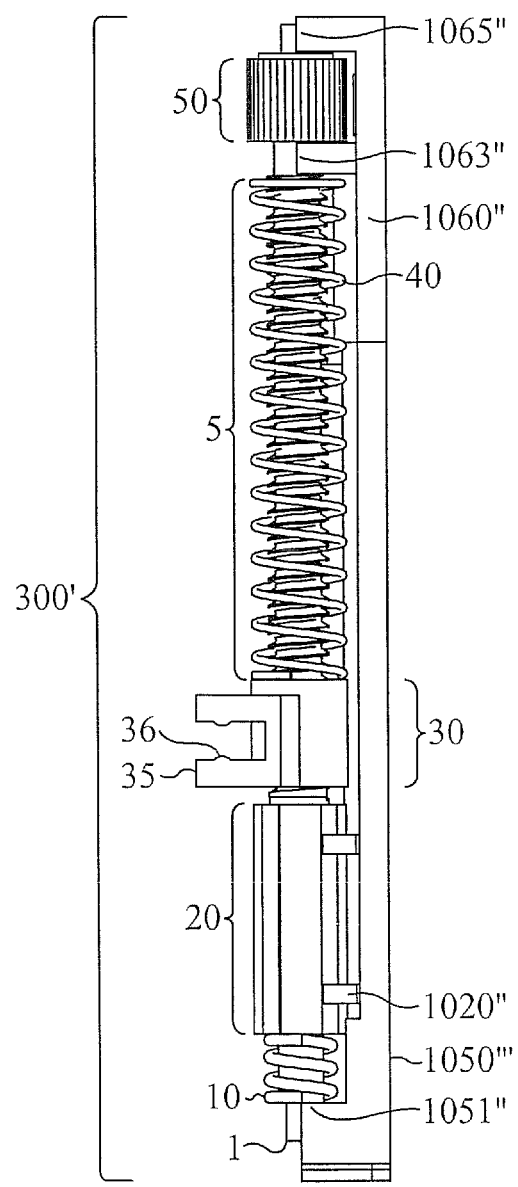
FIG. 3 is a side view of a lead screw assembly of an auto-focus and zoom module in accordance with some embodiments of the invention.

Referring now to FIG. 3, the exemplary lead screw assembly 300' is shown coupled with the sectioned housing comprising the rear component 1050' and the front component 1060'. The lead screw assembly 300' is structured around the lead screw 1. The assembly includes the actuator 10, the coupling nut 35, and the sensing target 50. In addition, the assembly includes the preload spring 20 and the anti-gearlash spring 40. The lead screw 1 comprises a threaded region 5 and two non-threaded regions. The actuator 20 is coupled with a first non-threaded region, while the sensing target 50 is coupled with a second non-threaded region. When coupled to the housing, the lead screw assembly 300' contacts specialized features of the rear component 1050 and the front component 1060'. These features include the lead screw retention wells 1051 and 1065, and the gearlash spring reference feature 1063. Preferably, these features comprise bearings configured to facilitate rotation of the lead screws.

Figure 5C:
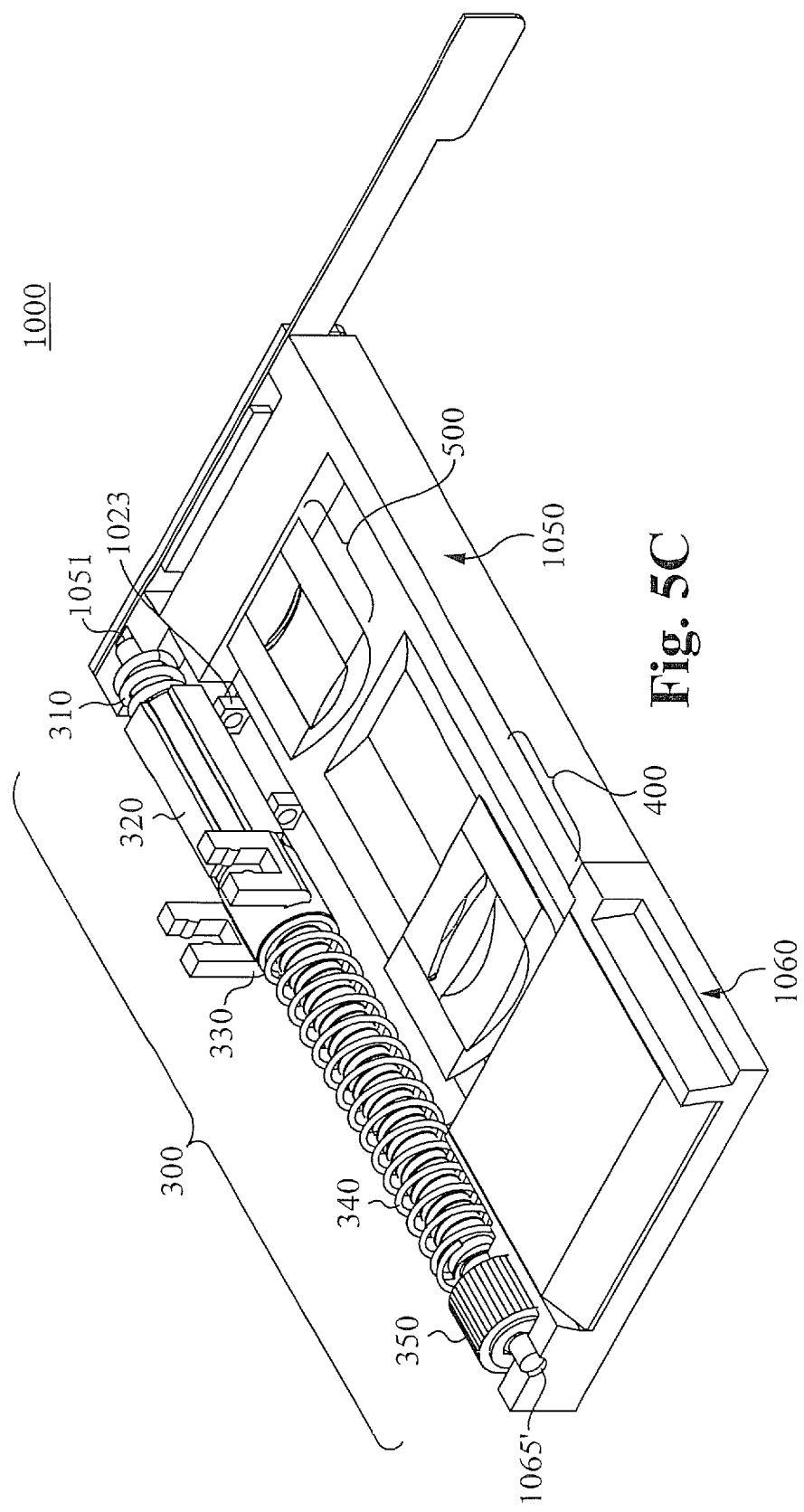
FIG. 5C is a sectional perspective view of an auto-focus and zoom module in accordance with some embodiments of the invention.

FIG. 5C illustrates a lead screw assembly 300, of the type shown in FIG. 3, coupled with a sectioned housing comprising the front component 1060 and the rear component 1050. As illustrated, the axis of the lead screw 300 is parallel with optical path formed through the lens groups of the rear optics group 500 and the front optics group 400.

Sensing Target

A lead screw assembly in accordance with some embodiments of the present invention includes a sensing target. The lead screw assembly 300' of FIG. 3 includes a sensing target 50 disposed between the lead screw retention well 1063 and the gearlash spring reference feature 1063. Typically, a sensing target includes a feature that interfaces with a registering feature of the second non-threaded region of a lead screw. For example, as can be seen in the partial cross-sectional view illustrated in FIG. 5A, the lead screw 260 includes registering features within its non-threaded regions. As shown, the second non-threaded region of the lead screw 260 includes the sensor target-registering feature 261. The registering feature 261 is configured to interface with corresponding features of the sensing target 250.

Actuator

The actuator 20 is positioned over a portion of the first non-threaded region. Typically, the actuator 20 includes a feature that interfaces with a registering feature of the first non-threaded region of the lead screw 1. For example, as shown in FIG. 5A, the lead screw 260 includes the actuator-registering feature 263 within its first non-threaded region. The actuator-registering feature 263 and corresponding features of the actuator 220 are configured to interface with one another.

Further, the actuator 20 is typically coupled to the housing through multiple means. In the lead screw assembly 300', the preload spring 10 couples the actuator 20 to the rear component 1050 of the housing, urging the actuator 20 against a referencing feature of the lead screw 1. In another example, the lead screw assembly 200 of FIG. 5A includes the preload spring 210 that exerts spring forces on both the rear component 1050 of the housing and on the actuator 220, to force a feature of the actuator 220 against the actuator-registering feature 263 of the lead screw 260. Other arrangements of actuator, preload spring, and registering feature(s) are discussed below with reference to FIGS. 12A-12D.

Another coupling means are actuator contact pads (e.g. 1023, 1022 of FIG. 1), which keep portions of an actuator in a fixed position relative to the housing, permitting the actuator to drive a lead screw in a rotational mode. For example, the actuator contact pads 1020 prevent the actuator 20 from rotating relative to the housing.

In addition to coupling the actuator 20 to the lead screw, the preload spring 10 provides a preload to the bearings upon which the lead screw turns. Typically bearings are coupled to the housing and located at the lead screw retention wells 1051 and 1065. In some embodiments, additional bearings are located at the gear lash spring reference feature 1063. To function properly, many bearing designs require that some minimal constraining force be supplied to hold the various portions of the bearing together. This force is typically termed the 'preload'. In some embodiments of the present invention, the preload spring exerts forces on the bearings located within the lead screw retention wells 1051 and 1065.

The present invention contemplates a variety of means for interface between actuators and lead screws. For example, FIG. 12A illustrates a preferred interface in accordance with the present invention, in this case between the actuator 20 and the lead screw 60. The actuator 20 is coupled with a non-threaded region of the lead screw 60. A feature of the actuator 20 is urged against an actuator-registering feature 63 of the lead screw 60, by the preload spring 10, which exerts forces against the housing 1 and the actuator 20. In this example, the actuator-registering feature 63 is disposed between the non-threaded region and the threaded region of the lead screw 60, where the non-threaded region has a smaller outer diameter than the threaded region, and a second relatively short non-threaded region is disposed between the actuator-registering feature 63 and the threaded region.

In another example, FIG. 12B illustrates an interface in accordance with the present invention, in this case between the actuator 20' and the lead screw 60'. The actuator 20' is coupled with a non-threaded region of the lead screw 60'. A feature of the actuator 20' is urged against an actuator-registering feature 63' of the lead screw 60', by the preload spring 10, which exerts forces against the housing 1 and the actuator 20'. In this example, the actuator-registering feature 63' is disposed between the non-threaded region and the threaded region of the lead screw 60, where the non-threaded region and the threaded region have approximately equal outer diameters.

In another example, FIG. 12C illustrates an interface in accordance with the present invention, in this case between the actuator 20" and the lead screw 60". The actuator 20" is coupled with a non-threaded region of the lead screw 60". A feature of the actuator 20" is urged against an actuator-registering feature 63" of the lead screw 60", by the preload spring 10, which exerts forces against the housing 1 and the actuator 20". In this example, the actuator-registering feature 63" is disposed between the non-threaded region and the threaded region of the lead screw 60, where the non-threaded region has a narrower outer diameter than the threaded region, and a second relatively long non-threaded region is disposed between the actuator-registering feature 63 and the threaded region.

In another example, FIG. 12D illustrates an interface in accordance with the present invention, in this case between the actuator 20''' and the lead screw 60'''. The actuator 20''' is coupled with a non-threaded region of the lead screw 60'''. A feature of the actuator 20''' is urged against an actuator-registering feature 63" of the lead screw 60''', by the preload spring 10''', which exerts forces against the housing portion 2 and the actuator 20'''. In this example, the actuator-registering feature 63''' is disposed between the non-threaded region and the threaded region of the lead screw 60, and the non-threaded region has a relatively larger outer diameter than the threaded region. Also, the preload spring 10''' and housing portion 2 are disposed between the non-threaded region and the threaded region.

Coupling Nut

A lead screw assembly typically includes a coupling nut. Preferably, a coupling nut includes teeth configured to interface with the threaded region of the lead screw. The teeth of the coupling nut perform several functions, discussed below. In the typical configuration, the teeth are configured such that rotation of the lead screw causes translation of the coupling nut along the long axis of the lead screw. For example, In FIG. 1, as the lead screw 200 rotates, the coupling nut 230 is translated along the z-axis of the lead screw. The direction of translation is correlated to the direction of rotation, with the precise correlation depending on the lead screw thread direction.

A coupling nut is also typically coupled to the housing via at least one spring configured to bias the teeth of the coupling nut relative to the lead screw threads. For example, the lead screw assembly 300' of FIG. 3 includes an anti-gearlash spring 40. The anti-gearlash spring is preferably separate from the actuator pre-load spring. Referring now to FIG. 5A, the lead screw assembly 200 includes the anti-gearlash spring 240 disposed between and exerts spring forces on each of the coupling nut 230 and the gearlash spring reference feature 1063 of the front component 1060 of the housing. Also, the pre-load spring 210 is disposed between and exerts spring forces on each of the actuator 220 and the face of the rear component 1050 adjacent to the lead screw retention well 1051.

Further, the anti-gearlash spring is separately coupled to the housing from the preload spring, such that the spring forces of the two springs are mechanically isolated from each other. Several features of the lead screw assembly configuration help isolate the spring forces: 1) the rigid coupling of the rear component 1050 and front component 1060 to form the housing, 2) the rigidity of the lead screw 260, 3) the threaded region 205 of the lead screw 260 constrains axial movement of the coupling nut 230, and 4) the actuator-registering feature 263 constrains axial movement of the actuator 220.

Lens-Coupling Nut Interface

Figure 6:
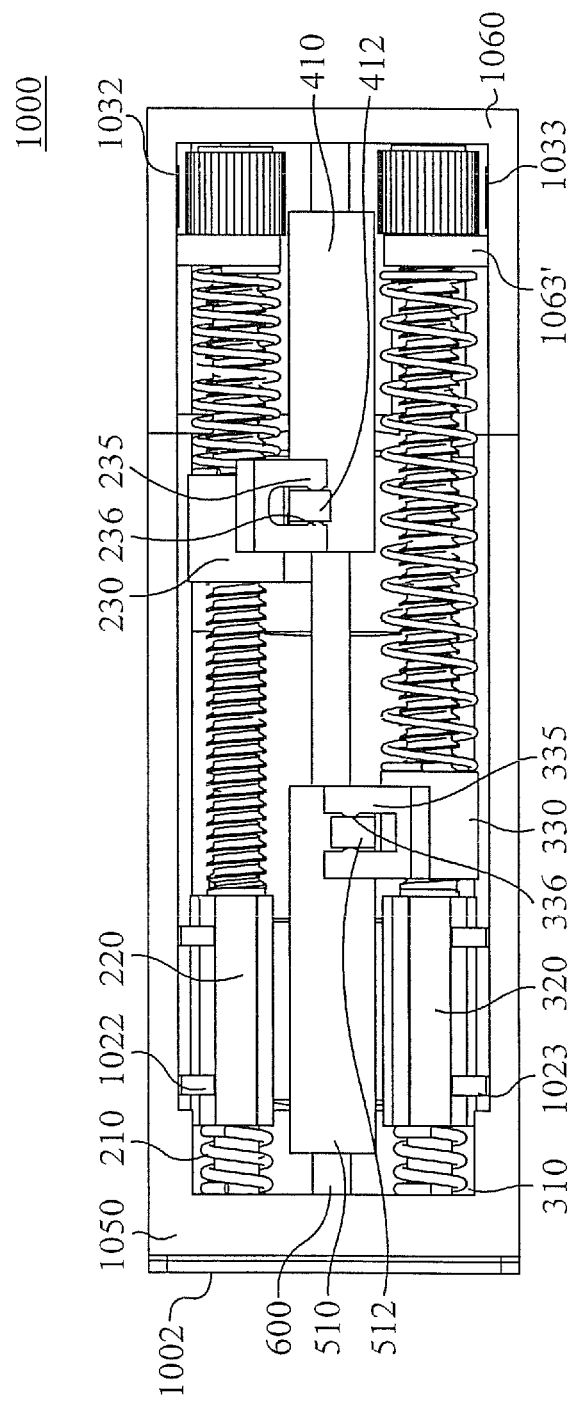
FIG. 6 is a side view of an auto-focus and zoom module in accordance with some embodiments of the invention.

Referring now to FIG. 6, the primary guide sleeves 410 and 510 of the front optics group 400 and rear optics group 500 (e.g. shown in FIG. 2), respectively, couple with the lead screws through the coupling nuts 230 and 330. Both primary guide sleeves 410 and 510 couple with the primary guide pin 600. The rear primary guide sleeve 510 includes a protruding feature 512 that interfaces with a slotted feature of the coupling nut 330. A perspective view of the interface between the protruding feature 512 and the slotted feature of the coupling nut 330 is illustrated in FIG. 5W The slotted feature is formed by the arms 335, and includes the reference surfaces 336. The references surfaces 336 protrude into the slotted feature of the coupling nut 330 to form a gap sized to accept the protruding feature 512. Preferably, the gap and protruding feature 512 are sized to fit together with substantially zero 'play' between the two parts.

Similarly, the front primary guide sleeve 410 includes a protruding feature 412 that interfaces with a slotted feature of the coupling nut 230. The slotted feature is formed by the arms 235, and includes the reference surfaces 236. The reference surfaces 236 protrude into the slotted feature of the coupling nut 230 to form a gap sized to accept the protruding feature 412. Preferably, the gap and protruding feature 412 are sized to fit together with substantially zero 'play' between the two parts.

In this preferred configuration, movement of a coupling nut along a lead screw axis results in translation of its counterpart guide sleeve along a guide pin. Since the guide sleeves are each a rigidly coupled component of an optics group, translation of a coupling nut results in translation of its counterpart optics group. However, a simple rigid connection between a coupling nut and a guide sleeve could accomplish this function. The illustrated configuration provides additional benefits by isolating the guide sleeve from non-translational movements of the coupling nut. The small contact area between the reference surfaces and the protruding feature of a guide sleeve serves to minimize friction, permitting movement of the coupling nut relative to the guide sleeve in the axes orthogonal to the axis of the lead screw. This configuration isolates most mechanical vibration or disturbance of the coupling nut from the optics group. Further, the isolation means that only the translational degree of freedom of the coupling nut need be controlled to achieve a required precision for positioning of the optics group.

The springs include in a typical lead screw assembly serve multiple purposes. For example the anti-gearlash spring couples a lead screw reference feature to a coupling nut. This coupling exerts spring forces on each element, biasing the coupling nut away from the reference feature.

C. Functional

The front optics group 400 is part of a first optics assembly that includes the first lead screw assembly 200. The rear optics group 500 is part of a second optics assembly that includes the second lead screw assembly 300. Together with other elements of the module 1000, the first and second optics assemblies provide for controlled movement and positioning of the optics groups 400 and 500 relative to the image sensor 1010.

The lead screw assembly 200 includes a threaded region 205. The coupling nut 230 provides an interface between the optics group 400 and the threaded region 205; translating rotation of the lead screw 260 into translation of the optics group 400. The coupling nut 230 in combination with other elements of the lead screw assembly 200 translates without binding and allows for hard stoppage of the optics group 400 for external referencing.

The lead screw assembly 200 also includes the actuator 220, which is configured to drive movement of the optics group 400 by rotating the lead screw 260. The configuration of the actuator 220 in combination with the various spring elements of the lead screw assembly 200 avoids high friction loads on the coupling nut 230 and allows for efficient transmission of energy from the actuator to the lead screw 260.

The lead screw assembly 300 includes a threaded region 305. The coupling nut 330 provides an interface between the optics group 500 and the threaded region 305; translating rotation of the lead screw 360 into translation of the optics group 500. The coupling nut 330 in combination with other elements of the lead screw assembly 300 translates without binding and allows for hard stoppage of the optics group 500 for external referencing.

The lead screw assembly 300 also includes the actuator 320, which is configured to drive movement of the optics group 500 by rotating the lead screw 360. The configuration of the actuator 320 in combination with the various spring elements of the lead screw assembly 300 avoids high friction loads on the coupling nut 330 and allows for efficient transmission of energy from the actuator to the lead screw 360.

The primary guide pin 600 and secondary guide pin 700, in combination with the optics groups 400 and 500, and coupling nuts 230 and 330, maintain alignment of the optical elements of the optics groups over their range of motion without binding.

The inclusion of position sensing targets 250 and 350 within the lead screw assemblies 200 and 300, in combination with the position sensors 1030 of the module 1000 permits use of non-linear actuators, e.g. 220, 320, to drive the lead screws 260, 360.

D. Operational Details

Guide Pin Arrangement

Referring now to FIG. 5B, the front guide sleeve 410 of the front optics group is elongated relative to the length of the front barrel 430 (FIG. 5A). Similarly, the rear optics group 500 includes the elongated rear guide sleeve 510, which couples with the primary guide pin 600. This configuration prevents the optics groups 400 and 500 from rotating within the y-z plane or x-z plane relative to the primary guide pin 600, but permits rotation within the x-y plane, assuming the guide pin 600 lies along the z-axis. Further, the guide sleeves are rigidly connected to the barrels. This configuration prevents the optics groups from rotating within the y-z plane or x-z plane relative to the primary guide pin 600, but permits rotation within the x-y plane, assuming the guide pin 600 lies along the z-axis.

Referring now to FIG. 1, the front optics group 400 also includes the front guide slot 420, configured to couple with the secondary guide pin 700. Similarly, the rear optics group 500 includes the rear guide slot 520. The coupling between the guide slots and the secondary guide pin 700 prevents the front and rear optics groups from rotating within the x-y plane relative to either of the guide pins 600 and 700. The coupling between the front and rear optics group and guide pins 600 and 700 permits the optics groups to translate along the axis defined by the two guide pins (the z-axis in FIG. 1), but not to move in either of the axes orthogonal to that axis (here the x and y axes).

Screw-Lens Coupling

Figure 4:
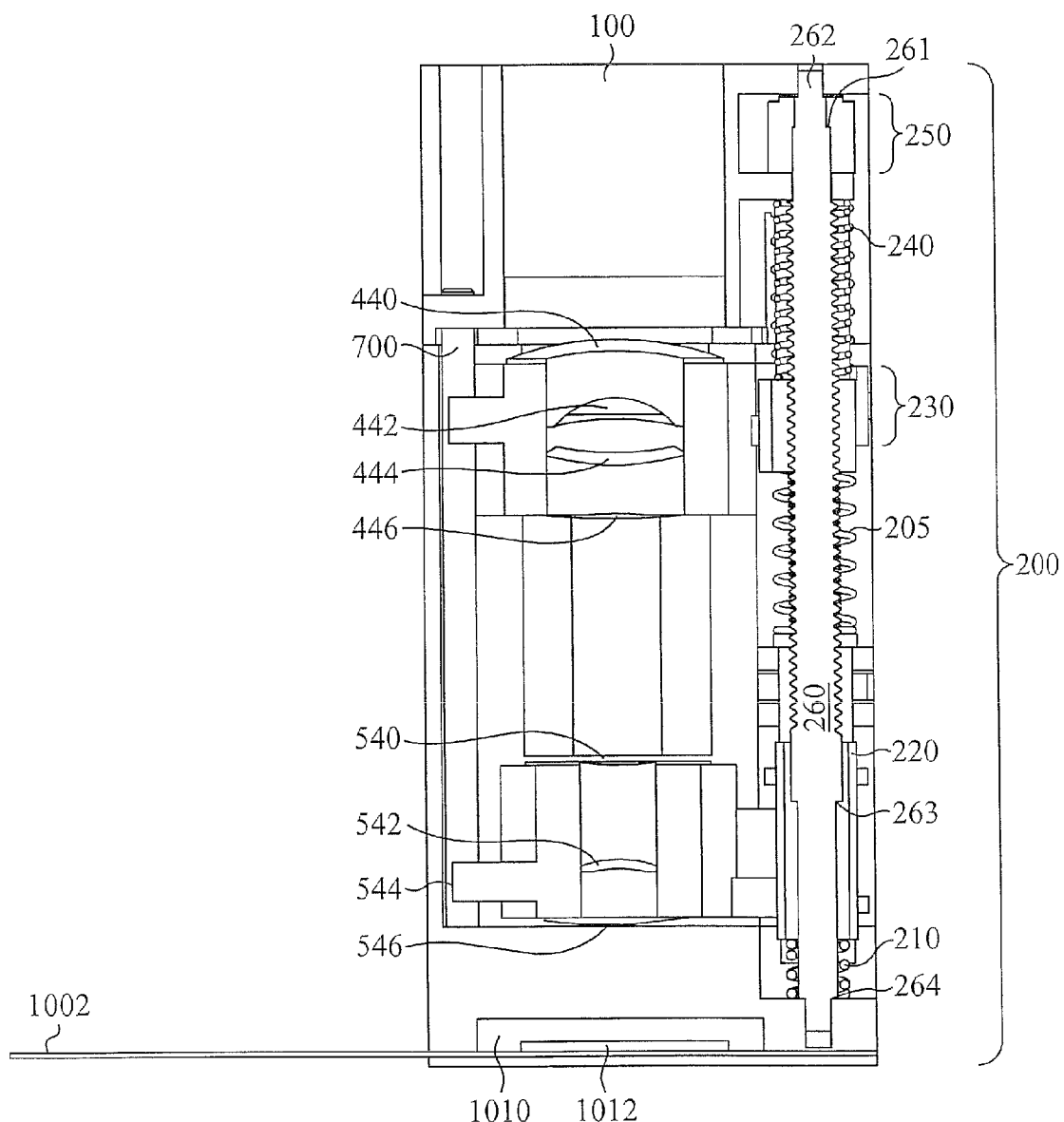
FIG. 4 is a sectional plan view of an auto-focus and zoom module in accordance with some embodiments of the invention.
Figure 7A:
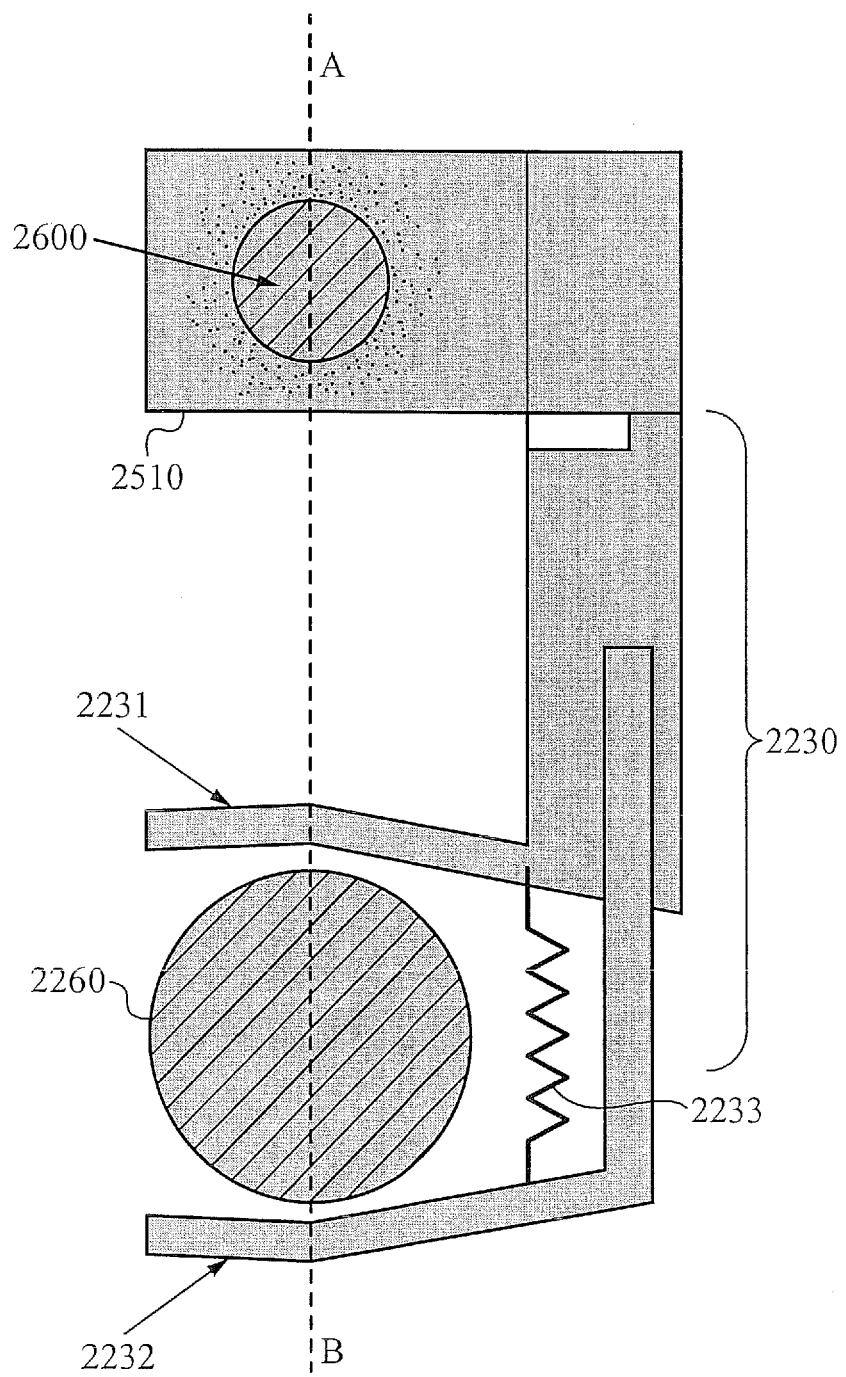
FIG. 7A is a sectional schematic representation of a coupling mechanism employed in an auto-focus and zoom module in accordance with some embodiments of the invention.
Figure 7B:
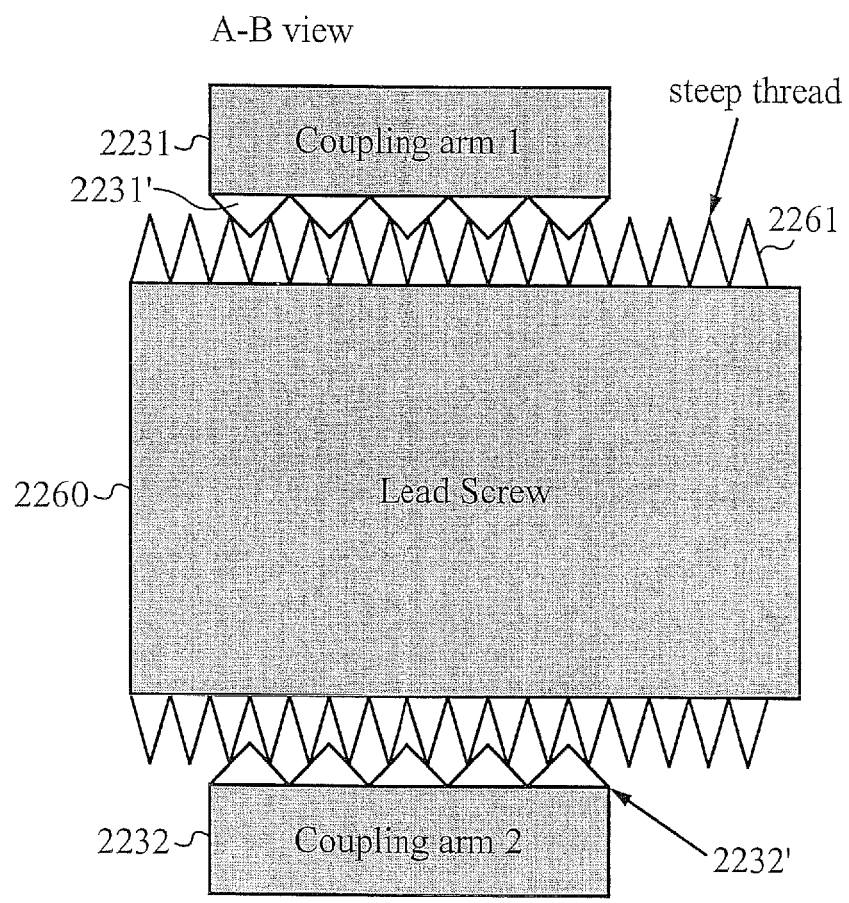
FIG. 7B illustrates a coupling using threads of different pitch in accordance with some embodiments of the invention.

FIGS. 4, 7A, and 7B illustrate further details of an interface between a coupling nut and a lead screw in accordance with some embodiments of the present invention. In some embodiments, as shown in FIG. 4, male threads of a lead screw 260 interlock with the teeth threads of the coupling nut 230. However, in some embodiments, other configurations are used. For example, as shown in FIG. 7A, a coupling nut 2230 preferably includes a first coupling arm 2231 and a second coupling arm 2232, each of which are urged against the lead screw 2260 by the spring 2233. Further, the coupling nut 2230 interfaces with a guide sleeve 2510. Preferably, the guide sleeve 2510 and the coupling nut 2230 are 'soft' coupled so that only movements aligned with the guide screw/guide pin axes are translated between the two.

FIG. 7B illustrates the interface between the coupling teeth 2231' and 2232', of the coupling arms 2231 and 2232 respectively, and the screw threads 2261 of the lead screw 2260. The coupling teeth 2231' and 2232' have a flatter thread angle than the screw threads 2261. Stated another way, the (radially measured) height of the screw threads 2261 exceeds the height of the coupling teeth 2231' and 2232'. This arrangement necessitates that the teeth and threads have different pitches. As illustrated, the pitch of the coupling teeth 2231' and 2232' preferably exceeds the thread pitch of the screw threads 2261. The pitch of the screw threads 2261 is preferably constant along the lead screw 2260. Thus, while the coupling nut 2230 moves along the lead screw 2260 a constant ratio is maintained between the pitch of the coupling teeth 2231 and 2232' and the threads with which they couple.

The gradient in thread angle between the coupling teeth 2231' and 2232' and the screw threads 2261, in combination with the urging of the coupling arms 2231 and 2232 by the spring 2233, permits for referencing of the optics group via a mechanical hard stop of the coupling nut 2230. In male thread-female thread couplings, a mechanical hard stop of the coupling nut whilst the lead screw is turning can lead to binding and thread damage. In contrast, in the illustrated system, if the lead screw 2260 is driven during mechanical hard stop of the coupling nut 2230, the steep screw threads 2261 act as a wedge against the flat coupling nut teeth 2231' and 2232', extending the spring 2233 and driving the coupling arms 2231 and 2232 apart. Thus, a mechanical hard stop of the coupling nut 2230 during rotation disengages the coupling teeth 2231' and 2232' from the thread teeth 2261, preventing binding. This permits position referencing of an optics group coupled to the coupling nut via a hard mechanical stop without precise switching of the lead screw actuator during referencing.

Furthermore, the gradient and the spring force provide a natural centering of each coupling tooth between the two thread portions with which it interacts. So long as the spring applies force evenly to each coupling tooth, the tooth naturally rests in a defined position relative to the thread portions. This centering reduces the incidence of "backlash" that can occur between a nut and bolt with threads of matched pitch and angle. Backlash is the uttering of the nut relative to the bolt when there is room for the nut thread to move within the groove of the bolt thread.

Referring now to FIG. 3, the anti-gearlash spring 40 also assists in preventing backlash. The spring 40 produces a spring force urging the coupling nut 30 away from the gearlash spring reference feature 1063. The teeth of coupling nut 30 are typically engaged with the thread of the threaded portion 5 of the lead screw, hence the spring force pushes the teeth of the coupling nut 30 toward the face of the thread proximal to the gearlash spring reference feature 1063.

Actuator Configuration

Referring now to FIG. 4, some embodiments of the present invention include an actuator 220 configured with a lead screw 260 to permit rotation of the lead screw 260 by the actuator 220. Preferably, embodiments of the present invention include features adapted to ensure efficient operation of the actuators.

For example, some embodiments of the present invention employ cylindrical vibrational actuators configurable to drive rotation of a non-threaded shaft. Exemplary actuators of this type are piezoelectric ultrasonic motors that interface with a non-threaded shaft through friction, causing the shaft to rotate without translating. Preferably the cylindrical actuators cause rotation of a shaft positioned therewithin when excited in resonant modes of vibration. These actuators are advantageously operated in a defined space with a substantially constant set of forces acting upon them.

FIGS. 4 and 6 illustrate a preferable configuration of actuators 220 and 320 in accordance with the present invention. As mentioned above, the vibrational actuators 220 and 320 operate with greater efficiency when they coupled in a defined space by substantially constant-force means. For example, as illustrated in FIG. 4, the preload spring 210 urges the actuator 220 against the actuator-registering feature 263 of the lead screw. This coupling forms a normal force between the actuator 220 and the actuator-registering feature 263, which increases any potential frictional force between the actuator 220 and the lead screw 260. Because the actuator 220 drives rotation of the lead screw 260 via friction, the preload spring 210 increases the potential drive force of the actuator 220. However, overly high frictional forces between the actuator 220 and the lead screw 260 can decrease the attainable rate of lead screw rotation. Preferably, the strength of the preload spring 210 is chosen to optimize efficiency while permitting a sufficiently high rate of rotation.

Further, in the illustrated embodiment, the normal force between the actuator registering feature 263 and the actuator 220 is solely determined by the preload spring 210. Though the anti-gearlash spring 205 exerts forces elsewhere along the lead screw assembly 200, these forces are isolated from the actuator 200. The actuator 200 does not translate along the lead screw 260, so the spacing between the actuator 220 and the housing 1050 remains constant. Thus, because the force exerted by the preload spring 210 upon both the actuator 220 and the housing 1050 is proportional to the spacing therebetween, the force remains substantially constant during operation of the actuator 220.

As shown in FIG. 6, the preload spring 310 provides analogous functions for the actuator 320 within the lead screw assembly 300. In addition, FIG. 6 illustrates the coupling of selected points on the actuator 320 via the actuator contact pads 1023 to the housing 1050.

As mentioned, the actuator 320 benefits from operating in a defined space. The preload spring 310 serves to maintain the actuator 320 within a longitudinal region of the lead screw 360. However, the preferred type of actuator employed within the illustrated embodiment requires additional stabilization to exert a rotational force on a lead screw. Interaction between the actuator and a lead screw causes rotation of one relative to the other. Because the module 1000 requires the lead screw 360 to rotate relative to the housing 1050, the actuator 320 is rotationally secured to the housing 1050 by the actuator contact pads 1023.

Aspects of the positioning and construction of the contact pads 1023 are adapted to minimize any negative effect on the efficiency of the actuator 320. The actuator contact pads 1023 are located at positions, called node points, on the actuator 320 that are substantially stationary during operation of the actuator 320 at a preferred set of resonances. In addition, the contact pads 1023 are preferably constructed of a resilient material configured to stretch and rebound, permitting limited movement of the node points away from their rest positions.

Though two actuator contact pads 1023 are illustrated in FIG. 6, some embodiments have a greater number, while other embodiments have fewer. In addition, the actuator contact pads 1022 perform a similar function in coupling the actuator 220 to the housing 1050 to permit rotation of the lead screw 260.

Preferably, embodiments of the present invention employ feedback from a position sensing system to control the actuators. Employing such a feedback system permits use of non-linear actuators within embodiments of the present invention and facilitates repeatability.

Referencing

Advantageously, some embodiments of the present invention include features adapted to permit hard mechanical stop of the lens groups without mechanical binding of the system. Such mechanical stoppage is preferably used for referencing in controlling positioning of the lens groups.

Referring now to FIGS. 7A and 7B, the gradient in thread angle between the coupling teeth 2231' and 2232' and the screw threads 2261, in combination with the urging of the coupling arms 2231 and 2232 by the spring 2233, permits for referencing of the optics group via a mechanical hard stop of the coupling nut 2230. In male thread-female thread couplings, a mechanical hard stop of the coupling nut while the lead screw is turning can lead to binding and thread damage. In contrast, in the illustrated system, if the lead screw 2260 is driven during mechanical hard stop of the coupling nut 2230, the steep screw threads 2261 act as a wedge against the flat coupling nut teeth 2231' and 2232', extending the spring 2233 and driving the coupling arms 2231 and 2232 apart. Thus, a mechanical hard stop of the coupling nut 2230 during rotation disengages the coupling teeth 2231' and 2232' from the thread teeth 2261, preventing binding. This permits position referencing of an optics group coupled to the coupling nut via a hard mechanical stop without precise switching of the lead screw actuator during referencing.

Position Sensing

As mentioned elsewhere, some embodiments of the present invention include position-sensing features configured to provide feedback to an actuator control system to permit accurate positioning despite use of non-linear actuator motors. An exemplary position sensing system comprises the position sensors 1030 and the position sensing targets 250 and 350 of the module 1000 of FIG. 1.

A position sensing system provides position data for a lens group over its range of motion. In some embodiments of the present invention, a position sensing system tracks the relative position of an optics group to within 10 microns over a range of 10 mm.

In some embodiments, a reflection encoding sensor coupled with a cylindrical sensing target are used to measure rotations of a lead screw. Since the optics group is coupled with the lead screw, which has known thread pitch, lead screw rotation is proportional to translation of the optics group along the lead screw axis.

Figure 10:
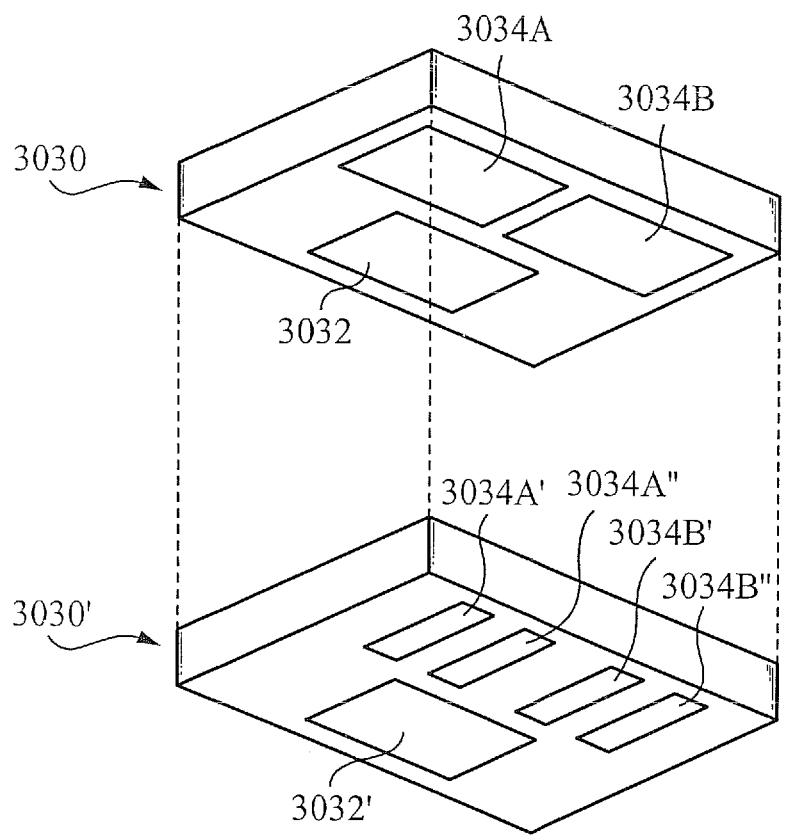
FIG. 10 is an exploded perspective view of an assembly for position sensing in accordance with some embodiments of the invention.
Figure 10:
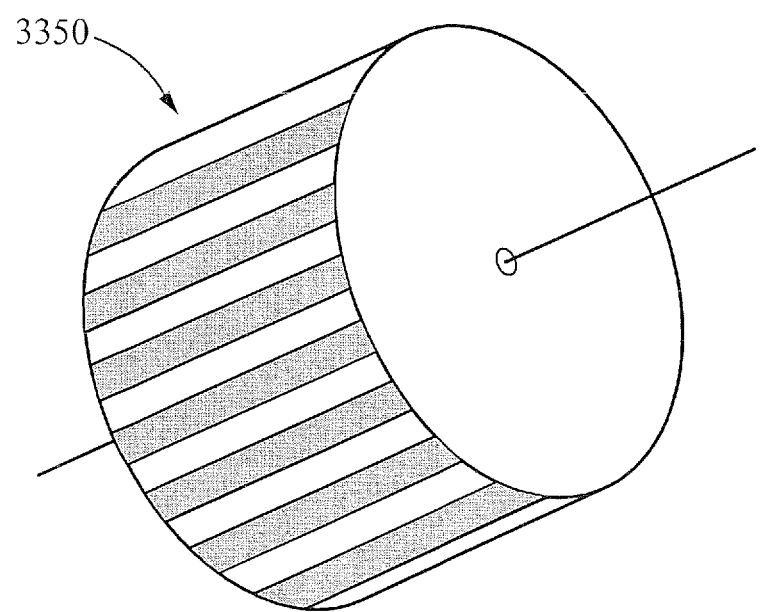

A more detailed view of a position sensing system employed within some embodiments of the present invention is shown in FIG. 10. The emitter/detector 3030 comprises the first sensor 3034A, the second sensor 3034B, and the emitter 3032. The mask structure 3030' includes the emitter window 3032' and the four sensor windows 3034A', 3034A", 3034B', and 3034B". In some embodiments the emitter/detector 3030 is a photoreflector. In some embodiments the emitter is an LED.

The dark bands of the sensing target 3350 absorb radiation emitted from the emitter, while the light bands of the sensing target reflect radiation emitted from the emitter. The sensors detect transitions in absorption and reflectance as the bands move relative to the sensor windows. Both the first sensor 3034A and the second sensor 3034B detect transitions. Preferably, the second sensor 3034B detects transitions out of phase with the first detector 3034A. Thus, by combining the out-of-phase data from the two sensors, a control system can detect the direction of movement as well as its magnitude. Though the sensing system is illustrated with a cylindrical scanning target, some embodiments of the present invention include similar systems using linear targets.

In traditional reflection encoding, the radiation used cannot be overly diffused by the time it reaches the sensing target. FIG. 8B illustrates the optimal maximum beam spreads for a series of light sources (white squares on left hand side) emitting light towards a series of absorptive and reflective bands (right hand side). The detail shown in FIG. 8C illustrates a 20-micron wide light source. In this case, the maximum optimal spread is 10 microns. Under normal conditions, this means the gap 'd' should be less than 56.7 microns. Thus, for the relatively narrow features shown in the apparatus of FIG. 10, the tolerance required would be quite small.

However, embodiments of the present invention include a variety of features and configurations adapted to loosen these tolerances or decrease problems caused by diffusion of the radiation used during reflection encoding.

Some techniques involve hardware or software measures that permit the use of lower resolution targets. Some embodiments employ additional hardware and/or firmware (e.g. a clock for timing and for analysis) to perform linear interpolation between detected transitions. However, if the actuator is very non-linear, interpolation can introduce positioning error.

Some embodiments employ a lower resolution target with a repeated pattern, but use additional processing of the sensor data to provide higher effective resolution. Examples include the detection of multiple thresholds during a-transition recorded within sensor data via analog circuitry and converting the output to digital. However, such embodiments require the inclusion of analog circuitry and additional calibration of an analog/digital converter during sensing. In some of these embodiments, calibration is accomplished automatically during power on.

Some embodiments employ a combination of linear interpolation and analog-digital converter circuitry to permit use of lower resolution targets. By employing these and other techniques, embodiments of the present invention can use lower resolution targets.

Preferably, the use of lower resolution sensing targets permits configurations in which only a small number of features of the target are within the field of view of a sensor at any given moment. A system of this type is illustrated in FIG. 8A. As shown by the cross sectional view, a position sensing system includes the cylindrical target 3350 positioned a distance d from the emitter/detector 3030. The field of view of the emitter/detector 3030 subtends a region of the target 3350 that includes a maximum of two transitions. In some embodiments the emitter/detector is a photoreflector. Preferably, a single feature (e.g. a stripe) dominates the field of view. Thus, the potential for artifacts or errors in transition detection is minimized. Typically, the feature size of the target is chosen based on the field of view. However, the required resolution can also be a factor in determining feature size.

Figure 11:
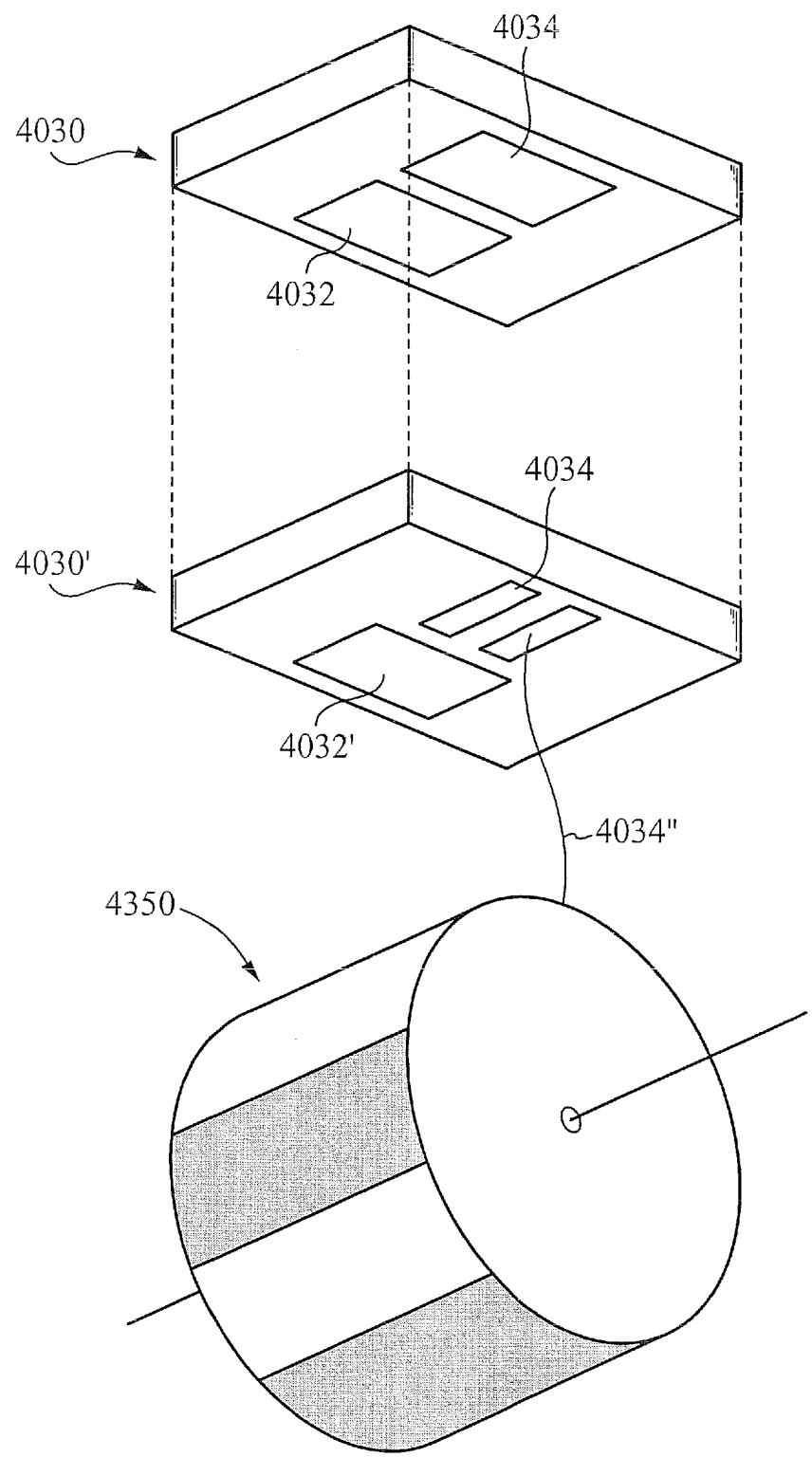
FIG. 11 is an exploded perspective view of an assembly for position sensing in accordance with some embodiments of the invention.

FIG. 11 is a more detailed view of a position sensing system employed within some embodiments, including the preferred embodiment, of the invention. The emitter/detector 4030 comprises the sensor 4034, the emitter 4032. The mask structure 4030' includes the emitter window 4032' and the two sensor windows 4034' and 4034". In some embodiments the emitter is an LED.

The dark bands of the sensing target 4350 absorb radiation emitted from the emitter, while the light bands of the sensing target reflect radiation emitted from the emitter. The sensors detect transitions in absorption and reflectance as the bands move relative to the sensor windows. Preferably, the sensor 4034 separately detects transitions in both sensor windows 4032' and 4034". In some embodiments the emitter/detector 4030 is a photoreflector.

In some embodiments, the sensor 4034 is capable of detecting transitions out of phase between the two windows. In these embodiments, by combining the out-of-phase data from the two sensors, a control system can detect the direction of movement as well as its magnitude. Though the sensing system is illustrated with a cylindrical scanning target, some embodiments of the present invention include similar systems using linear targets.

In some embodiments, each feature covers 60 degrees of the circumference of the cylindrical target. Thus, in one embodiment, a cylindrical target having a 12 mm circumference includes six 2 mm stripes in an alternating reflective/absorptive pattern. However, if a resolution greater than six counts per revolution of the sensing target is required, additional processing steps as outlined above are preferably employed.

Figure 9A:
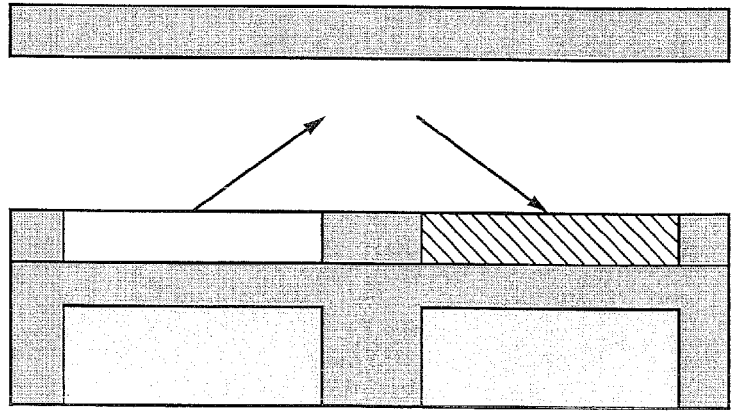
FIG. 9A is a schematic illustration of a direct imaging solution for distance sensing in schematic representation of beam spreading that occurs during distance sensing in accordance with some embodiments of the invention.

In addition, some embodiments perform additional processing steps on the radiation emitted from the LED before providing it to the sensing target. The method shown in FIG. 10 is termed direct imaging. Another example of direct imaging is illustrated in FIG. 9A. Radiation from an emitter (white rectangle) reflects from a target to a detector (hatched rectangle). Direct imaging requires the target and the sensor to be very near to one another.

Figure 9B:
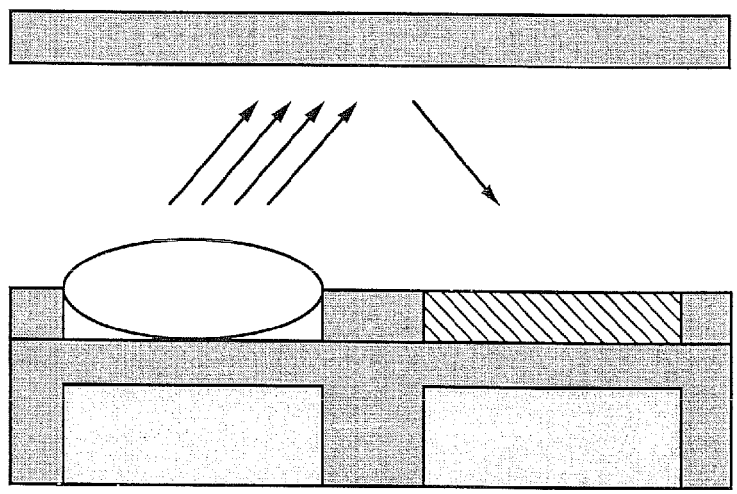
FIG. 9B is a schematic illustration of a lens-based imaging solution for distance sensing in accordance with some embodiments of the invention.

FIG. 9B illustrates a system in which a lens is used to collimate radiation from a detector. Collimation permits the target-sensor distance to increase. The maximum distance and tolerances are determined by the spreading of the radiation.

Figure 9C:
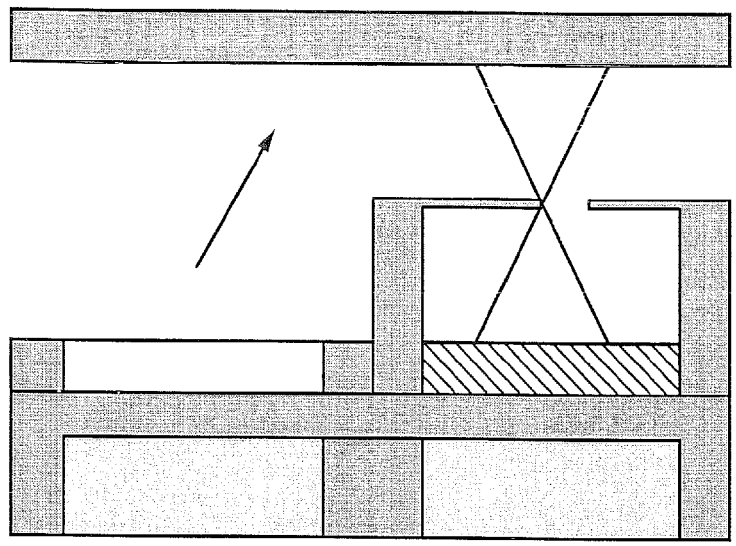
FIG. 9C is a schematic illustration of a pinhole-based imaging solution for distance sensing in accordance with some embodiments of the invention.

FIG. 9C illustrates a system in which a pinhole is used to prevent 'bleed over' from an adjacent region from preventing detection of a transition. In this case, reflected radiation must pass through the centered pinhole placed near to the target surface before reaching the detector. This system can require higher intensity LEDs, as relatively little light is available through the pinhole.

E. Advantages

As illustrated in the foregoing examples, the module of some embodiments is set to a continuum of different optical positions by electromechanical controls. These different optical positions advantageously provide a variety of picture taking modes. Via repeatable positioning and software control, the various positions and/or picture-taking modes can be optimally pre-set to fixed focus configurations for the module. Hence, some of the embodiments described above provide a variety of fixed focal lengths in a small form factor. These embodiments advantageously allow more sophisticated implementations for small devices that typically have limited capacity for multi focal optical and/or camera mechanisms. For instance, some embodiments advantageously include a plurality of focal and zoom positions in otherwise simple and compact devices. Since the described embodiments require limited range of motion, and have minimal space requirements, these embodiments have a variety of applications in ultra compact portable devices, such as, for example, in mobile phones and other consumer electronics. Some particular medical device applications include [_____].

Further, while realizing the benefits of multi focal functionality, the embodiments described above require little space and require only a limited range of motion, while having a low cost.

As described above, the optical elements of some embodiments are divided into two groups, one group housed in a front barrel, the other group housed in a rear barrel. For example, as shown in FIG. 4, the front group comprises the lenses 440, 442, 444, and 446, while the rear group comprises the lenses 540, 542, 544, and 546. Typically, the precise motion of these optics groups group within confined spaces is achieved by using the mechanism(s) described above.

The form factor of the auto-focus and zoom module of some embodiments is approximately 10×14×22 mm without a prism or approximately 10×14×30 mm including a prism.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system for stabilizing an optics assembly in a plane perpendicular to an axis of translation, comprising:
   a. a first guide pin, parallel to the axis of translation;
   b. a second guide pin, parallel to the axis of translation; and
   c. a lens housing including:
      i. a guide sleeve coupled to the first guide pin, wherein the guide sleeve is substantially elongated relative to the lens housing; and
      ii. a guide slot coupled to the second guide pin; and
   wherein the guide sleeve further comprises a first protruding feature that is configured to couple to a first drive coupling nut.

2. The system of claim 1, wherein the guide sleeve is rigidly coupled to the lens housing.

3. The system of claim 1, wherein the guide sleeve is slidably coupled to the first guide pin, along the axis of translation.

4. The system of claim 1, wherein the first protruding feature is rigidly coupled to the first guide sleeve.

5. The system of claim 1, wherein the first drive coupling nut comprises a slotted feature configured to receive the first protruding feature, and the first protruding feature is slidably coupled to the slotted feature.

6. The system of claim 5, wherein the first protruding feature is slidably coupled to the slotted feature in a plane substantially perpendicular to the axis of translation.

7. The system of claim 1, wherein the slotted feature comprises two arms forming the slot, each arm having a reference surface protruding into the slot, wherein the distance between the reference surfaces is sized to accept the first protruding feature with a substantially zero tolerance between the first protruding feature and the slotted feature.

8. A compact optical module comprising:
   a. a first guide pin defining an axis of translation;
   b. a second guide pin substantially parallel to the first guide pin;
   c. a first lens housing translatable along the first guide pin, including:
      i. a first lens barrel having a first lens barrel face, facing toward a second lens housing;
      ii. a first guide sleeve rigidly coupled to the first lens barrel and slidably coupled to the first guide pin;
      iii. a first guide slot rigidly coupled to the first lens barrel and slidably coupled to the second guide pin;
      iv. a first drive interface rigidly coupled to the first guide sleeve and configured to interface with a corresponding first drive interface surface on a first drive coupling nut, and wherein one of the first guide sleeve and the first drive interface protrudes beyond the first lens barrel face, along the axis of translation, toward the second lens housing;
   and
   d. the second lens housing translatable along the first guide pin, including:
      i. a second lens barrel;
      ii. a second guide sleeve rigidly coupled to the second lens barrel and slidably coupled to the first guide pin; and
      iii. a second guide slot rigidly coupled to the second lens barrel and slidably coupled to the second guide pin;
      wherein the second lens housing comprises a recessed portion configured to receive the portion of the first lens housing that protrudes beyond the first lens barrel face, along the axis of translation, toward the second barrel face.

9. The module of claim 8, further comprising a second drive interface rigidly coupled to the second guide sleeve and configured to interface with a corresponding second drive interface surface on a second drive coupling nut, and configured to extend along the axis of translation in a direction away from the first lens housing.

10. The module of claim 8 wherein the first guide sleeve is elongated, such that the length of the first guide sleeve in the axis of translation is longer than the first lens barrel in the axis of translation.

11. The module of claim 10, wherein second guide sleeve is elongated, such that the length of the second guide sleeve in the axis of translation is longer than the second lens barrel in the axis of translation.

* * * * *